(12) United States Patent
Weaver et al.

(10) Patent No.: US 9,524,132 B2
(45) Date of Patent: Dec. 20, 2016

(54) SYSTEM AND METHOD FOR REMOTELY SERVICING AN INDUSTRIAL PRINTER

(71) Applicant: VIDEOJET TECHNOLOGIES INC., Wood Dale, IL (US)

(72) Inventors: Robert Weaver, Sandy Springs, GA (US); Robert Neagle, Algonquin, IL (US)

(73) Assignee: Videojet Technologies, Inc., Wood Dale, IL (US)

( * ) Notice: Subject to any disclaimer, the term of this patent is extended or adjusted under 35 U.S.C. 154(b) by 0 days.

(21) Appl. No.: 14/876,062

(22) Filed: Oct. 6, 2015

(65) Prior Publication Data

US 2016/0098234 A1    Apr. 7, 2016

Related U.S. Application Data

(60) Provisional application No. 62/060,834, filed on Oct. 7, 2014.

(51) Int. Cl.
| | |
|---|---|
| G06F 3/12 | (2006.01) |
| G06K 15/02 | (2006.01) |
| G03G 15/00 | (2006.01) |
| B41J 2/165 | (2006.01) |
| B41J 2/02 | (2006.01) |

(52) U.S. Cl.
CPC .............. *G06F 3/1234* (2013.01); *B41J 2/165* (2013.01); *G03G 15/502* (2013.01); *G03G 15/5079* (2013.01); *G06F 3/121* (2013.01); *G06F 3/1217* (2013.01); *G06F 3/1287* (2013.01); *G06F 3/1294* (2013.01); *G06K 15/02* (2013.01); *B41J 2/02* (2013.01); *B41J 2002/16573* (2013.01); *G03G 2215/00113* (2013.01)

(58) Field of Classification Search
CPC ....... G06F 3/1234; G06F 3/121; G06F 3/1294
USPC .......... 358/1.14, 1.15; 399/11, 12, 16, 24, 44
See application file for complete search history.

(56) References Cited

U.S. PATENT DOCUMENTS

| | | |
|---|---|---|
| 7,346,086 B2 | 3/2008 | Ryan |
| 2002/0057456 A1 | 5/2002 | Dauer |
| 2003/0051079 A1* | 3/2003 | Kolodziej ............. G06F 3/1204 710/17 |

(Continued)

FOREIGN PATENT DOCUMENTS

| | | |
|---|---|---|
| CN | 102692896 | 11/2013 |
| EP | 0599523 | 1/1994 |

(Continued)

*Primary Examiner* — Jamares Q Washington

(57) ABSTRACT

A method and system for remote servicing of an industrial printer includes obtaining, on a processor, sensor data that indicates values output by a sensors configured to measure physical phenomena related to a plurality of components of the industrial printer. Also obtained, on the processor, is parameter data that indicates values for parameters that indicate user settings for operation of the industrial printer. It is determined, on the processor, a service issue related to the industrial printer based on the sensor data and the parameter data, It is also determined, at least in part on the processor, an action to be performed on the industrial printer in response to the service issue. Furthermore; the action is caused to be initiated. In some embodiments, the action is initiated at one facility different from a facility where the industrial printer is located.

21 Claims, 17 Drawing Sheets

(56) References Cited

U.S. PATENT DOCUMENTS

| | | | |
|---|---|---|---|
| 2007/0266424 A1 | 11/2007 | Haaf | |
| 2007/0277057 A1 | 11/2007 | Braun | |
| 2008/0126860 A1* | 5/2008 | Sampath | G06F 11/0733 |
| | | | 714/25 |
| 2010/0257414 A1* | 10/2010 | Peters | G03G 15/221 |
| | | | 714/57 |
| 2014/0344402 A1* | 11/2014 | Tivey | G05B 19/4185 |
| | | | 709/217 |

FOREIGN PATENT DOCUMENTS

| | | |
|---|---|---|
| EP | 2393054 | 12/2011 |
| WO | 2011098345 | 8/2011 |
| WO | 2013041888 | 3/2013 |

* cited by examiner

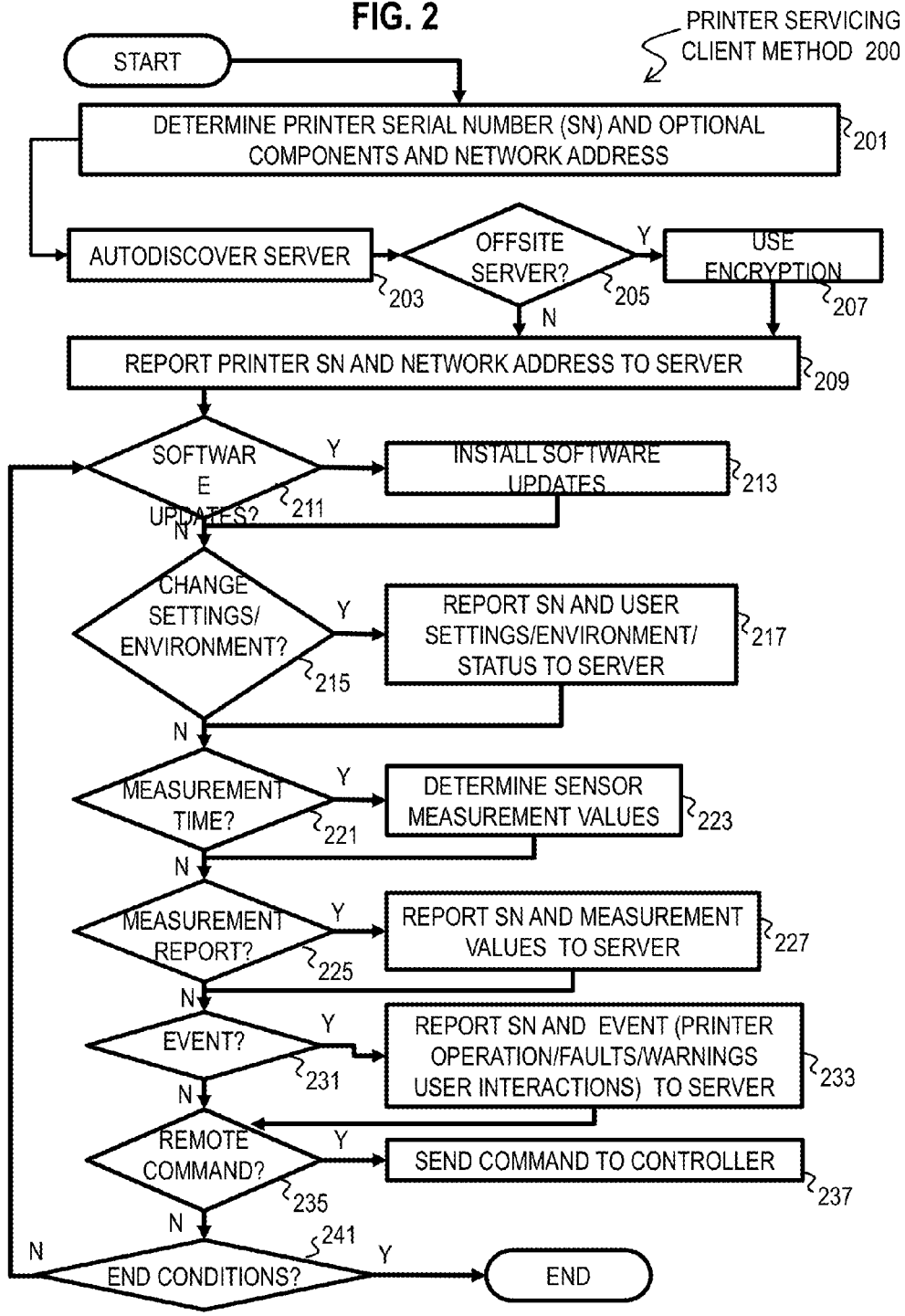

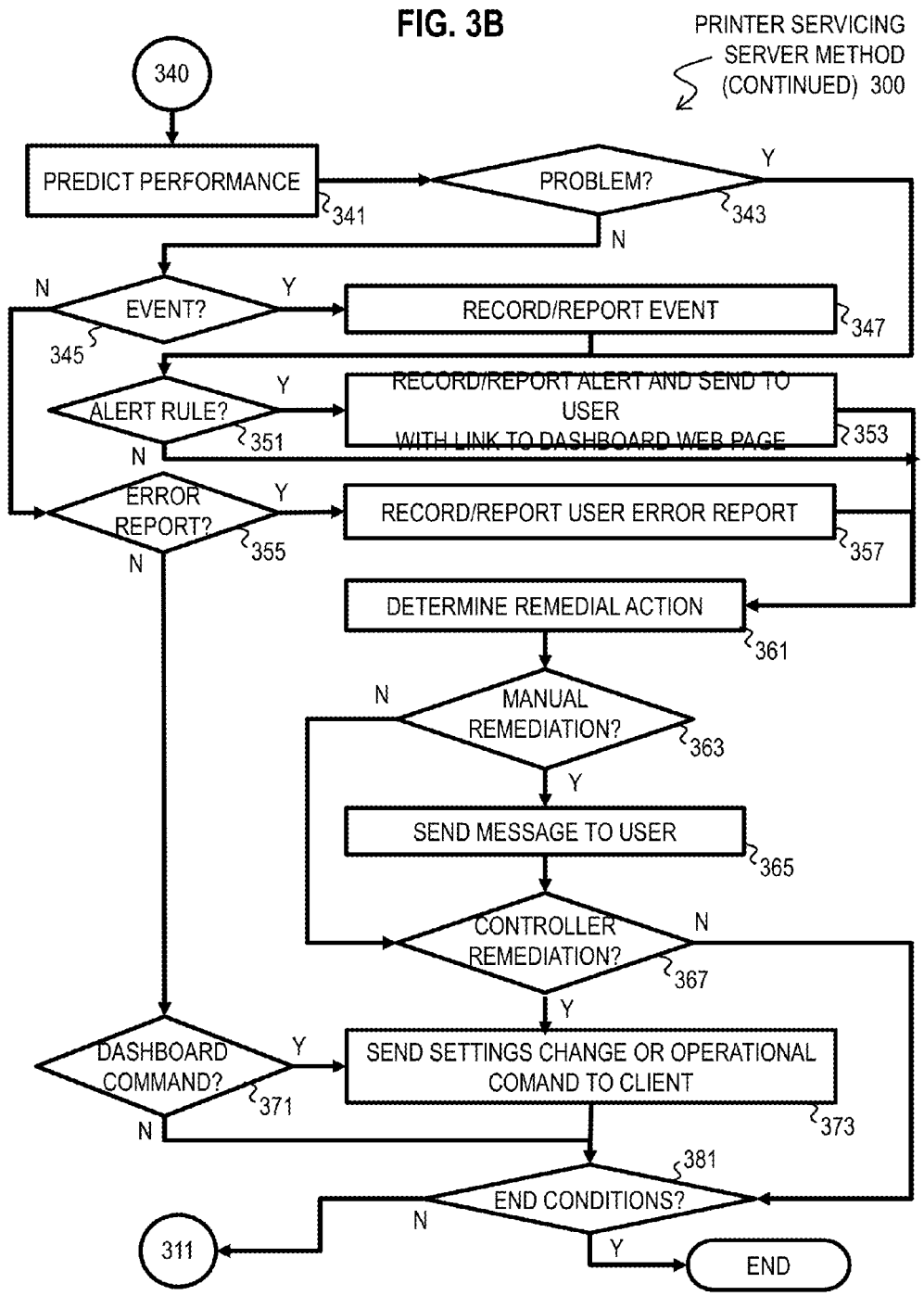

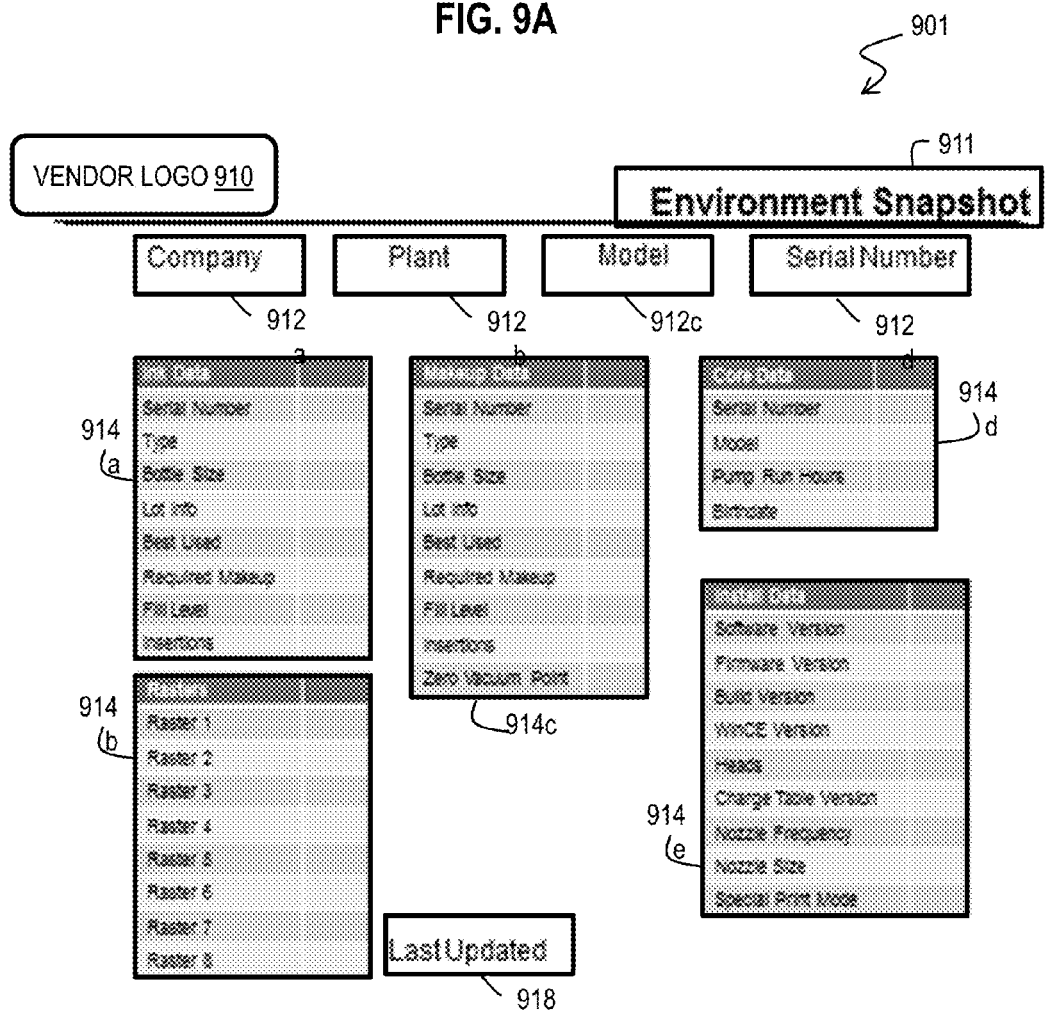

FIG. 9B

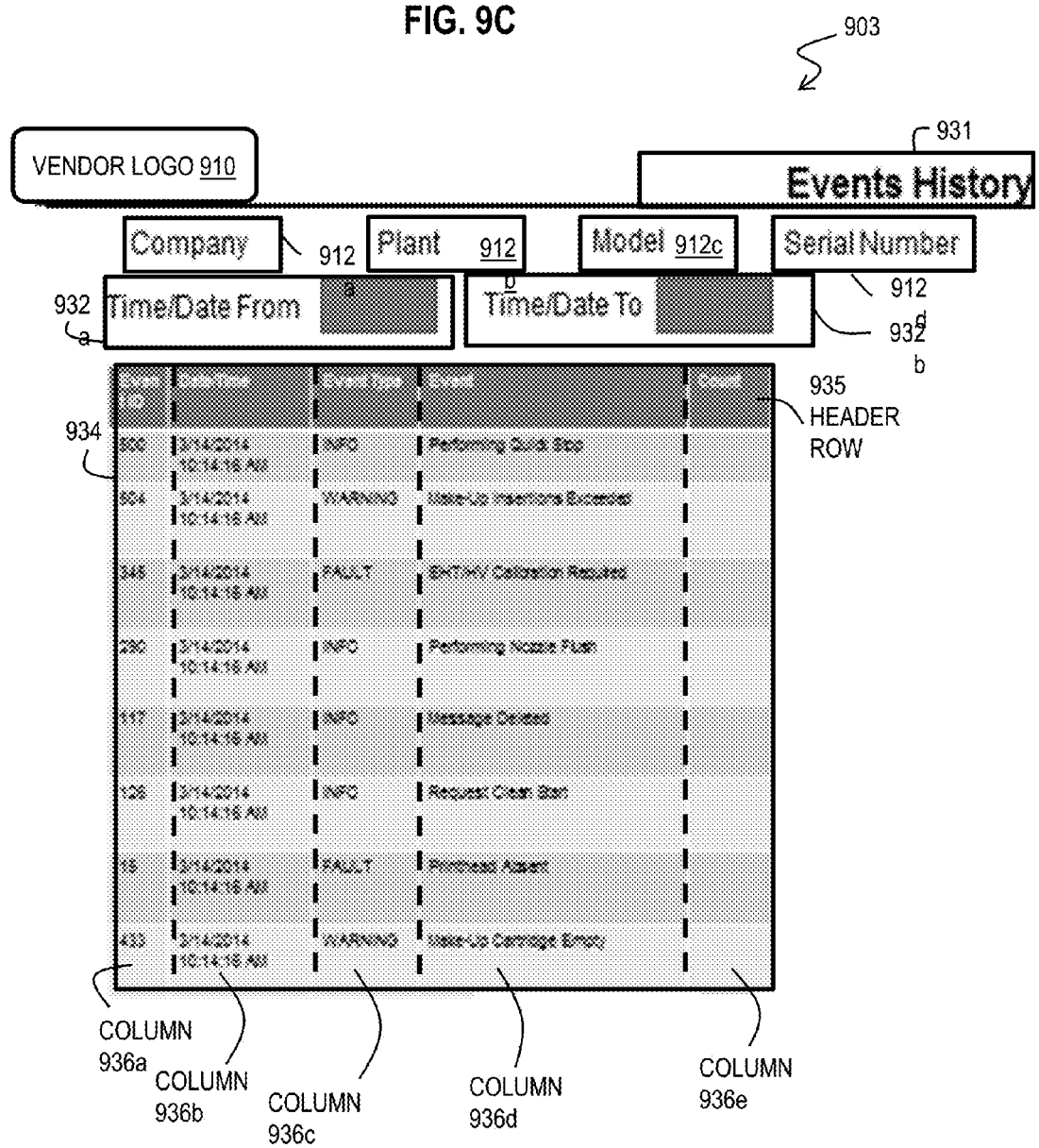

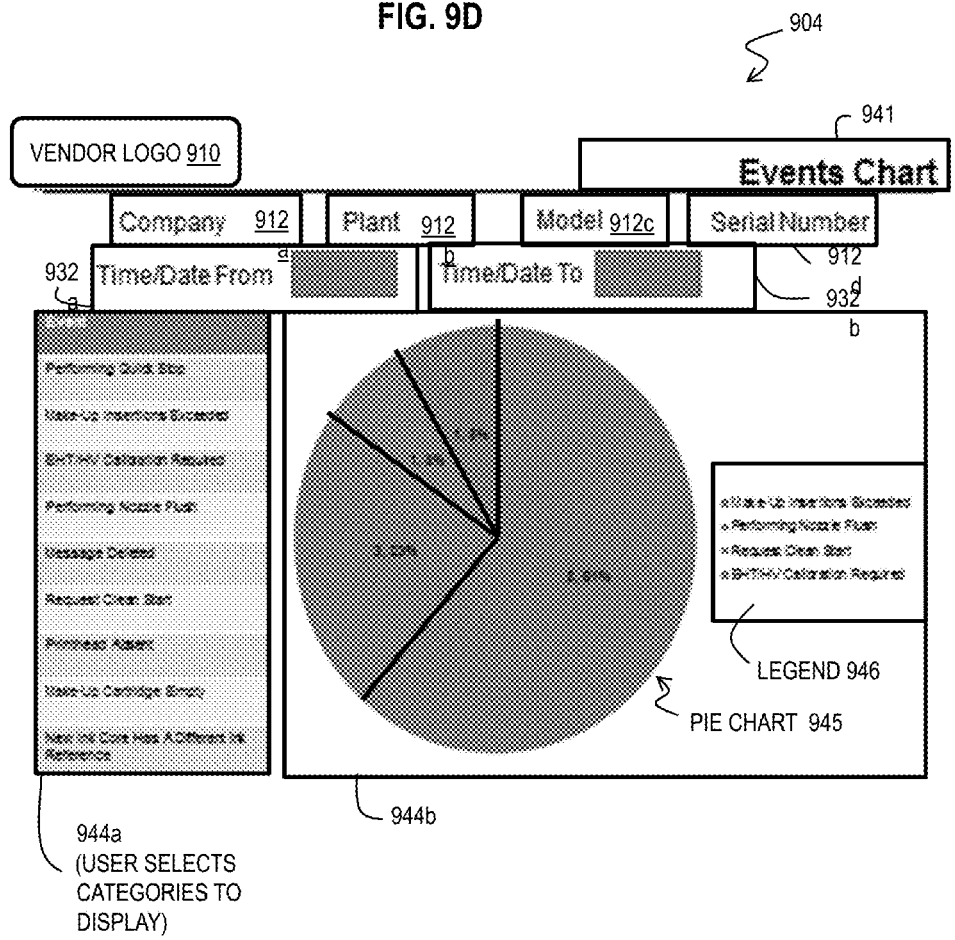

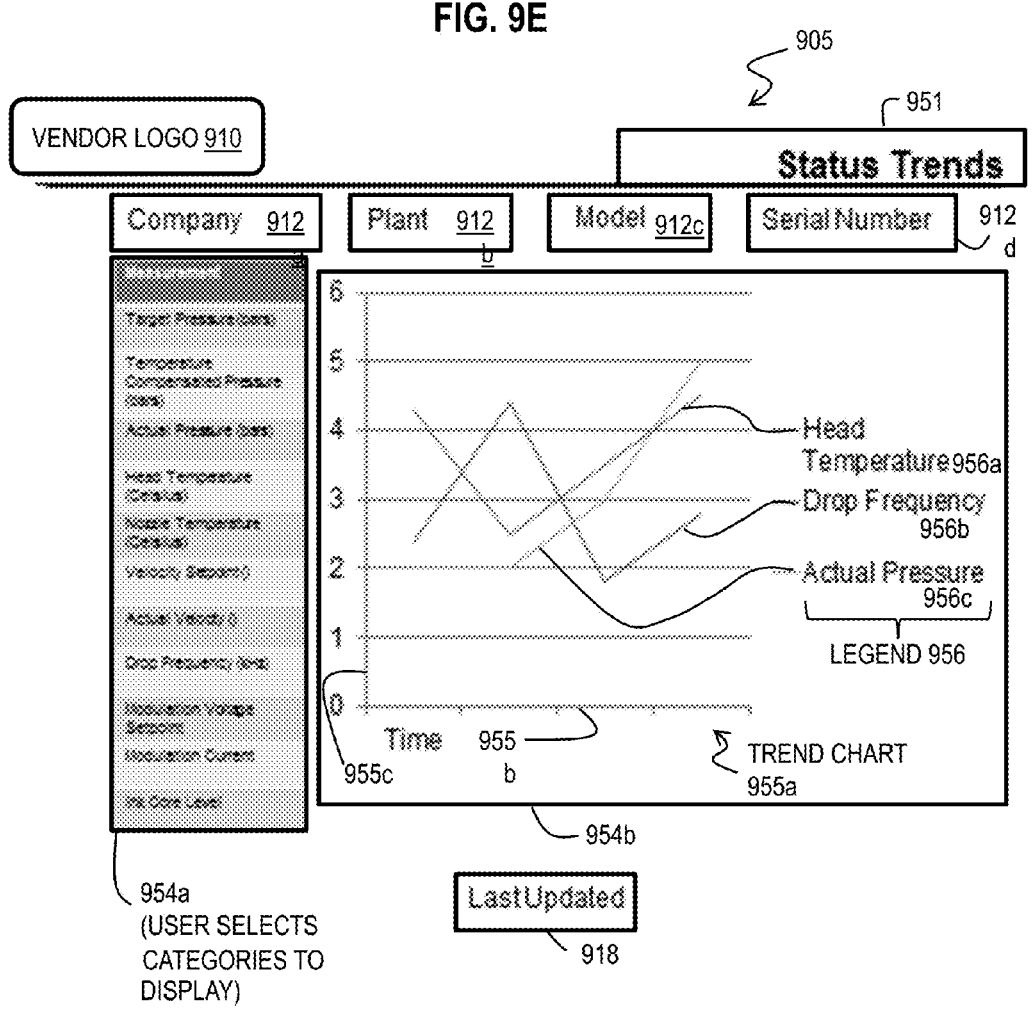

SYSTEM AND METHOD FOR REMOTELY SERVICING AN INDUSTRIAL PRINTER

BACKGROUND

Industrial printers, such as continuous inkjet printers, are used in production line printing to mark products or product packaging with information related to the product. These printers are sophisticated devices with many components. For example, some components charge an ink mixture, and other components apply electric fields in order to control movement of droplets of the makeup fluid to form desired patterns on the product or product packaging.

These printers may include various sensors to monitor sensor values associated with one or more components of the printer. For example, sensors at the print head may be used to monitor the temperature at the print head or monitor the temperature of components of the print head. Temperatures exceeding a desired print head temperature may result in over consumption of solvent which directly affects the viscosity of the ink. To that end sensors may be provided at the ink supply of the printer to monitor the viscosity of the ink. In addition, ink level sensors may be provided to monitor the level of ink remaining in an ink supply tank or an ink make-up tank. Additionally, a printer controller may be configured to generate alerts or warnings based sensor values generated by the sensors. In addition, user interface data and event data is generated for some printers. For example, user interface data may include print enable/print disable data, which may include the date and time a printer was enabled and then subsequently disabled by an operator, or the date and time of one or more print head cleaning operations. Other data used by some industrial printers include values for user set parameters, such as production line speed, image height and width, distance a substrate is from a print head, and actual print head temperature.

SUMMARY

It is here noted that sometimes operators do not timely react to alerts or warnings issued by a printer controller, which could lead to component failures and printer downtime. Despite extant monitoring and data storage capabilities, failures occur that result in production downtime to correct the problems. Therefore, techniques are provided for remote servicing of an industrial printer.

In some embodiments, various data are stored and communicated for automated use and proper attention. For example, user interface data or event data or user-set parameter values are stored for subsequent analysis and detection of current or potential issues. In some embodiments, data derived relative to print head cleaning operations (including the number of times a print head is cleaned over a specified time period, or the number of quick clean operations that may have been performed over a specified time period) are determined based on the data provided by an industrial printer.

In addition, user-set parameter values entered by a user during printer set up are stored and analyzed during printing operations. For example, a printer may miss prints on products or packaging in the production line, or the print on the product is stretched. In such cases, the operator(s) may not have the technical expertise to evaluate the appropriateness of the values entered for the user-set parameters or to determine the cause of the error, and must contact the printer supplier to seek technical assistance, which may include a supplier technician dispatched to the location of the printer In a first set of embodiments, a method includes obtaining, on one or more processors, sensor data that indicates multiple values output by corresponding sensors configured to measure physical phenomena related to multiple components of an industrial printer. The method also includes obtaining, on the one or more processors, parameter data that indicates multiple values for corresponding parameters that indicate user settings for operation of the industrial printer. The method further includes determining, on the one or more processors, a service issue related to the industrial printer based on the sensor data and the parameter data. Still further, the method includes determining, at least in part on the processor, an action to be performed on the industrial printer in response to the service issue; and, causing the action to be initiated.

In some embodiments of the first set, at least one of the one or more processors is at a remote site separated from a local site where the industrial printer is located. For example in some embodiments, the remote site is separated from the local site by at least about one hour travel time. In some of these embodiments, the local site is a facility of a first entity that uses the industrial printer and the remote site is a facility of a different second entity that services the industrial printer, such as a manufacturer or supplier of the industrial printer.

In some embodiments of the first set, determining the service issue includes determining the service issues based at least in part on historical data derived from sensor data and parameter data obtained over at least a month of time from a plurality of different industrial printers located at a plurality of different sites separated from the remote site.

In some embodiments of the first set, determining the action to be performed includes determining that the action is replacement of a particular component of the plurality of components of the industrial printer. Then, causing the action to be initiated includes causing a technician to be dispatched with the particular component from the remote site.

In some embodiments of the first set, determining the action to be performed includes determining that a first value for a particular parameter of the plurality of parameters that indicate user settings should be changed to a different second value. Then, causing the action to be initiated includes communicating, from the remote site to the local site, correction data that indicates the different second value and the particular parameter. In some of these embodiments, communicating the correction data includes automatically sending a command to the industrial printer that causes the industrial printer to change the first value for the particular parameter to the different second value.

In some embodiments of the first set, determining the action to be performed includes determining that a particular printer operation should be performed. Then, causing the action to be initiated includes communicating, from the remote site to the local site, a command that automatically causes the particular printer operation to be performed.

In a second set of embodiments, a system includes: processors located at multiple facilities at corresponding different locations; an industrial printer configured to apply ink to a package on an production line at a particular facility; a communications network configured to support data communication among the plurality of processors; and, at least one memory including one or more sequences of instructions. The at least one memory and the one or more sequences of instructions are configured to, with at least one processor, cause the system to obtain sensor data that indicates a first plurality of values output by a first corresponding plurality of sensors configured to measure physical phenomena related to a plurality of components of the industrial printer. The system is also caused to obtain parameter data that indicates a second plurality of values for a second corresponding plurality of parameters that indicate user settings for operation of the industrial printer. Furthermore, the system is caused to determine a service issue related to the industrial printer based on the sensor data and the parameter data. Still further, the system is caused, at least in part, to determine an action to be performed on the industrial printer in response to the service issue; and to cause the action to be initiated.

In other sets of embodiment, a computer-readable medium or apparatus is configured to perform one or more steps of the above method.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates an example method in an industrial printer for remote servicing of the printer, according to one embodiment;

FIG. 3A and FIG. 3B compose a flow diagram that illustrates an example method in a remote processor for remote servicing of the printer, according to one embodiment;

FIG. 9A is a block diagram that illustrates example printer environment variables display elements (e.g., for use with dashboard) for remote monitoring of printer, according to one embodiment;

FIG. 9B is a block diagram that illustrates example printer measurements display elements (e.g., for use with dashboard) for remote monitoring of printer, according to one embodiment;

FIG. 9C is a block diagram that illustrates example printer events log display elements (e.g., for use with dashboard) for remote monitoring of printer, according to one embodiment;

FIG. 9D is a block diagram that illustrates example printer events graphical display elements (e.g., for use with dashboard) for remote monitoring of printer, according to one embodiment;

FIG. 9E is a block diagram that illustrates example printer measurement trends graphical display elements (e.g., for use with dashboard) for remote monitoring of printer, according to one embodiment;

DETAILED DESCRIPTION

A method and apparatus are described for remote servicing of an industrial printer. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of services provided by one entity (e.g., a manufacturer, re-seller or retailer of industrial printers) for many other entities, e.g., different companies that are each customers and users of the industrial printer and that are remote from the service provider. However, the invention is not limited to this context. For example, in some embodiments one entity owns many printers at one or more facilities, and the service is provided from a service center within one facility that has many printers by the same entity that uses the printers; or, the service is provided across several separated facilities that each has one or more industrial printers, by the same entity that uses the printers. In some embodiments, one entity provides a service center for many other entities that each have their own service center, e.g., with a stock of spare parts or spare printers or one or more knowledgeable technicians, or some combination.

Service call data indicates that in 70% of the cases a technician goes on site, they do not replace a part. The techniques presented here allow tech support personnel to resolve most of these issues remotely. When they cannot, it is expected that they can supply the technician with key information required for onsite resolution, such as the part(s) that may be required, ensuring a fix the first time. This will reduce downtime by automatically informing the customer maintenance team or the service provider technical support team, or both, of abnormal conditions and supplying the relevant information to address the service issue. The printer service provider personnel can connect to and monitor the printer, to assess the issue and either provide corrective action remotely or dispatch an informed service technician with the correct parts to fix it right the first time. Real time performance is presented at a dashboard graphical user interface (GUI) to display how printers are performing and help service provider personnel to pinpoint areas for improvement in the coding process for setting user selectable options.

1. Overview

Figure 1A:
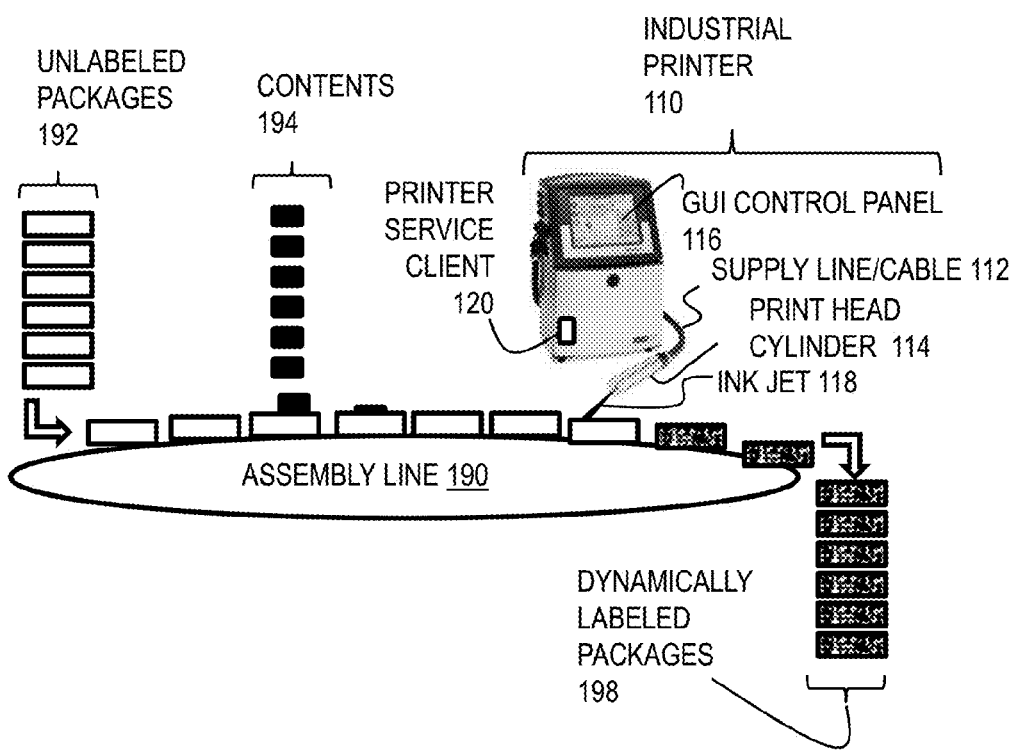
FIG. 1A is a block diagram that illustrates an example production line with industrial printer, according to one embodiment.

FIG. 1A is a block diagram that illustrates an example production line 190 with industrial printer 110, according to one embodiment. Unlabeled packages 192 enter the production line and receive contents 194. Upon sealing, industrial printer directs an ink jet 118 onto the package which exits the production line as a stack or palette or other collection of dynamically labeled sealed packages 198. In other embodiments, the steps are performed in a different order, e.g., the package 192 is labeled by printer 110 before loading in the contents 194; or, the contents 194 are labeled directly, and the package 192 is omitted. If the printer 110 fails, or the labels applied are incorrect, then the production line 190 is halted until a fix is achieved, reducing productivity of the line 190. Furthermore, if the label is incorrect, one or more labeled packages 198 have to be discarded, adding losses and further damaging productivity of the facility where the line 190 is located.

As shown in FIG. 1A, a print head cylinder 114 is directed to the packages, and is fed by a supply line 112 from the body of the printer 110 in which one or more ink and/or makeup reservoirs are housed. The printer has a control panel (such as graphical user interface, GUI, control panel 116) to receive commands from a user. Some printers, such as continuous ink printer model 1510 from Videojet Technologies Inc. of Wood Dale, Ill., includes one or more processors, configured to perform one or more software or firmware controlled processes. Such processors are often part of a chip set, as described in more detail below with reference to FIG. 11.

In the illustrated embodiment, the printer 110 is configured to perform a printer service client process 120, which allows control of the printer 110 based on data exchanged with a remote processor, as described in more detail with reference to some following figures. Often, the remote processor is another chip set as described with reference to FIG. 11, or a computer or computer systems as described in more detail below with reference to FIG. 10.

Figure 1B:
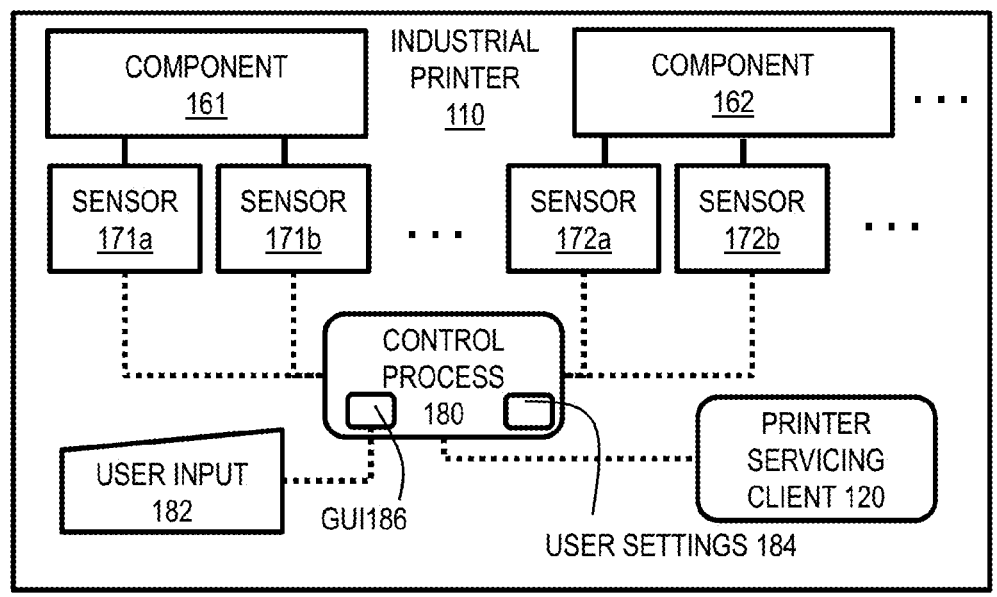
FIG. 1B is a block diagram that illustrates example components and sensors in an industrial printer, according to one embodiment.

FIG. 1B is a block diagram that illustrates example components and sensors in an industrial printer 110, according to one embodiment. The printer 110 includes component 161, component 162 and other indicate by ellipsis (collectively referenced hereinafter as components, 160). Each component 160 has associated zero or more sensors (collectively referenced hereinafter as sensors 170), each configured to measure a physical phenomenon associated with the component. As illustrated, component 161 has associated sensor 171*a*, sensor 171*b* among others indicated by ellipsis; and, component 162 has associated sensor 172*a*, sensor 172*b* among others indicated by ellipsis. For example, in some embodiments, a nozzle component has a temperature sensor, a jet velocity sensor, a pressure sensor, a modulation voltage sensor, a modulation current sensor and a modulation frequency sensor. Other example components and associated sensors for a continuous ink printer are possible.

For example, there may be various sensors for various components in the printhead, ink system, consumables, and electronics. These sensors provide information on parameters related to the corresponding component. The combined information from the various sensors from various components provide unprecedented amounts of information on the status of various systems in the printer to allow a remote user to diagnose and predict potential issues, such as faults, warning, or failures, with the printer. The printhead may include a nozzle with sensor parameters such as the modulation voltage setpoint, modulation current, frequency, temperature, jet velocity setpoint, actual velocity, target pressure, temperature-compensated target pressure, and actual pressure; phase sensor parameters including selected phase, phase rate of change, profile, and phase threshold; EHT parameters such as voltage, current, trip value, and % of trip; gutter parameters such as build up, time since last clean, warning level setting, and presence of ink in gutter; printhead heater parameters such as set temperature, actual temperature, and drive; printhead cover parameters such as status (on or off) and time since last removed; the status of various printhead valves (open, closed, and time open or closed); nozzle parameters such as nozzle size, target velocity, serial number, manufacture date, drop frequency, print count, run hours, and drops deflected.

The ink system may include sensor parameters such as ink pump parameters such as pressure, speed, current, and pump run hours; ink reservoir parameters such as ink type, ink expiry date, fluid level (ml and/or %), print hours remaining, and ink tank temperature; make up reservoir parameters such as make up type, expiry date, makeup vacuum, fluid level (ml and/or %), print hours remaining, and makeup tank temp; viscometer parameters such as target time to empty, actual time to empty, density, viscosity, and fill time; ink quality parameters such as ink conductivity; condenser parameters such as status (on or off), temperature, and vent valve (on or off); filter/damper module parameters such as ink filter pressure drop, serial number, manufacture date, run hours, and replacement date; service module parameters such as flush pump speed, flush pump current, serial number, manufacture date, run hours, replacement date, and information for various service module valves (open, closed, and time open or closed); ink cartridge parameters such as ink type, recommended make up type, serial number, manufacture date, expiry date, cartridge size, fluid level, run elapsed time, time to cartridge replacement, number of cartridge insertions, viscosity coefficient(s), fluid density, modulation algorithm numbers, and cold start algorithm numbers; make up cartridge parameters such as makeup type, serial number, manufacture date, expiry date, cartridge size, fluid level, run elapsed time, time to cartridge replacement, and number of insertions.

Other printer parameters include air filter parameters such as date last replaced, run hours, and replacement date; fume/gas sensors within the printer cabinet; humidity sensors within the printer or for ambient measurement; main control board parameters such as time and date, electronics temperature, HV voltage, HV Current, and the voltage of various other power supplies within the electronics.

Data is transferred from the sensors 170 to a control process 180, such as a control software program running on a processor of the industrial printer 110, as indicated by dotted lines. The illustrated process 180 presents a graphical user interface GUI 186 for receiving user input 182, including values for user-set parameters or selections of a printer operation, such as a quick clean operation, or some combination. The values for the user-set parameters are stored in a user settings data structure 184.

Based on the sensor data or the printer operations selected by the user, or the user settings 184, or some combination, the control process 180 is configured to issue a fault (e.g., that a component is not working, or is not working properly), if appropriate; or, issue a warning (e.g., that a sensor indicates a measured value is approaching a value outside the normal range for the corresponding component), if appropriate. The fault or warning is displayed in a user interface, such as GUI 186. Example faults and warnings include some or all those listed in Table 1, among others.

TABLE 1

Example fault and warning events for an industrial printer.
Faults and Warnings

| | |
|---|---|
| Charge Error | Leveler ROR Low |
| EHT Trip | Leveler ROR Middle |
| Gutter Fault | Leveler ROR High |
| No Time To Phase | Gutter ROR |
| Ink System Service Soon (10% left) | Product Delay Too Short |
| Ink System Service Soon (5% left) | Line Too Fast Latched, Product Delay Too Short |
| Ink System Service Soon (2% left) | Print Overlap Latched, Inter-Print Gap Too Short |
| Ink Core Service Soon (0.5% left) | Too Often Latched |
| Ink System Service Overdue | Error Opening Log |
| Missed Print Turn Jet On | No USB Stick |
| Missed Print Enable Print | Error Writing to Log |
| No Time For Time of Flight (TOF) | Configs Ready |
| Bad Nozzle | Printhead On |
| Mixer Empty | Printing |
| Pump Fault | Service Mode |
| Elect Too Hot | Test Print Mode |
| Cabinet Too Hot | Default Mode |
| Mixer Empty | Pressure Stable |
| No Viscosity Control | Temature Stable |
| Green Light ON | Clean Start |
| Yellow Light ON | Clean Stop |
| Red Light ON | Quick Start |
| No Phase Data From PE | Quick Stop |
| No Phase at Low Threshold | System Flush Purge |
| No Phase at High Threshold | Nozzle Flush |
| Bad Phasing | Umbilical Purge |
| Bad Phase No Frequency Adjust | System Fill |
| No Good Phase Start | System Empty From Full |
| Modulation Read Back Error | System Empty From Low |
| Mixer Empty | Valve Test |
| Raster Memory Overflow | Not Used |
| Valve Error | Good Phase |

TABLE 1-continued

Example fault and warning events for an industrial printer.
Faults and Warnings

| | |
|---|---|
| System Fill Failure or Tank Not Filling | Good Time of Flight (TOF) |
| System Fill Again | Modulation Low |
| Real Time Clock (RTC) Invalid | Modulation High |
| Ink Core Change | Viscosity Too High |
| EHT Not Calibrated | Viscosity Too Low |
| Printhead Temperature Too High | Tuning Required |
| Printhead Temperature Too Low | Ink Ready for Empty |
| Time of Flight Too High | Make-up Ready for Empty |
| Time of Flight Too Low | Printhead Off |
| Gutter Detect Disabled | Guarded Selection |
| Printhead Cover Removed | All Threads Suspend |
| Phase Threshold Error | EHT Inhibited |
| Ink viscosity Too High | Abort System Fill |
| Ink Viscosity Too Low | System Flush |
| Pressure Too High | Production Flush |
| Pressure Too Low | Sequence All Stop |
| Mod Driver Chip Over Temperature | Print Overlap |
| No Ink Cartridge | No Time to Phase |
| Wrong Ink Cartridge | No Time for Time of Flight (TOF) |
| ink Cartridge Expired | Overspeed |
| Ink Cartridge Low | Too Often, Print Queue Too Deep |
| Ink Cartridge Empty | No Valid Ink Parameters |
| Ink Insertions Exceeded | Possible Ink Coefficient Update |
| No Make-up Cartridge | USB Connection Is Over Current |
| Wrong Make-up Cartridge | Heater Failure |
| Make-up Expired | Tank, Core not Filling |
| Make-up Cartridge Low | DAC Overflow |
| Make-up Cartridge Empty | DAC Comms Error |
| Make-up Cartridge Insertions Exceeded | Charge Not Trimmed |
| Ink Core Level High | Throw Error |
| Ink Core Level Low | FW Table Index Not Found |
| Pump Fault | FW Compensation Has No Rasters |
| Pump Near Maximum | Creating Raster Catalog |
| Cabinet Hot | Wrong Raster Table Name |
| Product Delay Too Short | Gutter Pump Fault |
| Line Too Fast, Overspeed | Cover Detect Disabled |
| | Charge Not Trimmable |

Faults and warnings are two kinds of events determined by the control process 180. Other events determined by the control process 180 include user operations input through the user input 182, and machine operations, such as print cycles, timestamps, and other operations listed in Table 2.

TABLE 2

Example other events for an industrial printer.

| User Actions | Ink Data | Makeup Data |
|---|---|---|
| PrintEnable | Serial Number | Serial Number |
| PrintDisable | Time/Date | Time/Date |
| CleanStart | Ink Serial Number | M/U Serial Number |
| CleanStop | Ink Cartridge: Ink Type | M/U Cartridge: Ink Type |
| QuickStart | Ink Cartridge: Bottle Size | M/U Cartridge: Bottle Size |
| QuickStop | Ink Cartridge: Lot Info | M/U Cartridge: Lot Info |
| AbortCurrentSequence | Ink Cartridge: Best Used | M/U Cartridge: Best Used |
| NozzleFlush | Ink Cartridge: Information on Running | M/U Cartridge: Information on Running |
| MessageSelect | Ink Cartridge: #Cartridge Insertions | M/U Cartridge zero vacuum point (offset) |
| MessageDeleted | Ink Cartridge: Required Makeup Type | M/U Cartridge: Refit count |
| NewInkCartridge | | |
| NewMakeupCartridge | | |
| NewCore | | |
| ClearAlarms | | |
| PowerOff | | |
| PowerOn | | |
| SystemTimeChanging | | |
| SystemTimeChanged | | |

Values for other variables used and maintained by the control process 180 are called environmental variables. Example environmental variables include hardware, firmware and software versions, among others, as listed in Table 3.

TABLE 3

Example environmental variables for an industrial printer.

| Installation Data | Core Data |
|---|---|
| Serial Number | Serial Number |
| Time/Date | Time/Date |
| Model | Core Serial Number |
| Software Version | Printer Model |
| Firmware Version | Ink Core: Pump run hours |
| Build Version # | 1710 Birthdate |
| WinCE version | |
| CSB type (revision) | |
| Single Head/Dual Head | |
| Charge Table Version | |
| Nozzle Frequency | |
| Nozzle Micron Size | |
| Special print mode setting (Off, Traversing, DIN) | |

Values for the user-set parameters are also used and maintained by the control process 180. Example user-set parameters are listed in Table 4.

TABLE 4

Example user-set parameters for an industrial printer.
User set Parameters

| | | |
|---|---|---|
| PDType | BaudRate | JobName |
| PulseRate | FlowControl | MessageSelectSource |
| X3100EncoderType | BaudRate | MessageSelectBarcodeSource |
| ReductionFactorNumerator | Serial | MessageSelectBarcodeOffset |
| MultiStroke | ActualPressure | MessageSelectStringTail |
| ReverseMessage | HeadTemp | MessageSelectLength |
| ReverseAllCharacters | NozzleTemp | DisplayProdCount |
| MessageHeight | VelocitySetpoint | ChargeValue |
| MessageWidth | ActualVelocity | DropFreq1 |
| EncoderType | DropFrequency_1 | PhaseThreshold1 |
| SimPDDistanceMicroMeters | ModulationVoltageSetpoint_1 | AutoPrintOnJets |
| PH2PDDistanceMicroMeters | ModulationCurrent_1 | AutoPrintOnSelect |
| SubstrateDistanceMicroMeters | PrintingPhase_1 | SpecialPrintMode |
| LineSpeedMicroMetersPerSec | PhasingThreshold_1 | ReversedDelayM |
| PrintRepeatDistanceMicroMeters | CabinetTemperature | GutterDetect |
| ContinuousPrintMode | MakeupVacuum | Daylight |
| ContinuousPrintPECTriggered | EHTVoltage | NozzleType |
| ContinuousPrintPECGated | EHTTrip | RollOverHour |
| PrintingDistance | InkCorePumpRunHours | RollOverMin |
| TimeModeDelayUS | GutterDetectStatus_1 | MesageConfigUnits |
| ThrowDistance | InkCoreLevel | ConduitLength |
| PrintIntervalMicroMeters | PrintCount | HeadElevation |
| ProductLengthMicroMeters | PhaseProfile_1 | CoverDetect |
| EncoderResolution | InkCartridgeInfoOnRunning | GutterTacho |
| ProductPECFilterEnabled | MakeupCartridgeInfoOnRunning | BufferingPrintMode |
| Mode | TargetPressure | PrintCompletePulses |
| MsgMode | TCTargetPressure | EHTMaxV |

For a network including a plurality of industrial printers, which may number in the thousands, it can be seen that there is a huge amount of data that can be obtained, including the above-mentioned sensor data, parameter data, fault and warning events, other events, and environmental data. All of this data in combination can be considered historical data. Based on this historical data, a computer system or processor can determine correlations between the data, such as between environmental conditions and fault data. For example, it may be determined that for printers in high temperature environments, pump motors are more likely to overheat and have a shorter service life. These correlations can be used to determine the action to be performed on the printer.

The sensor data can be used (potentially in combination with historical data) to predict potential failures or other faults. Examples are shown in Table 5 below. For example, if the speed of a pump is changing over time, it may indicate that the pump is wearing and will fail at a certain point. As another example, an increasing pressure drop across a filter indicates that maintenance on the filter may be required. By compiling historical data from hundreds or thousands of printers in the field under a variety of operating and environmental conditions, correlations are made between the sensor data and the potential faults so that uptime can be maintained. For example, it may be know that after the pressure drop across a filter reaches a certain value, the printer will experience a failure 90% of the time within the next week. Therefore, it is advisable to perform preventative maintenance on the filter before failure occurs. As another example, for a fume/gas sensor, it may be determined that if the gas content (e.g. solvent such as MEK) in the printer cabinet exceeds a predetermined value, that indicates that, more likely than not, there is a solvent leak in the printer and maintenance needs to be performed. It can be seen that a variety of such correlations may be deduced from sensor data and used to provide a variety of warnings or actions to be taken.

TABLE 5

Example predictive faults for an industrial printer.

| Sensor Data | Potential Fault |
|---|---|
| Gutter build up % | EHT trip or clipping code |
| EHT % of trip value | Miscalibration, very dirty print head |
| Phase threshold | Ink charging problems |
| Phase rate of change | Break up instability |
| Humidity | Water contamination of ink, lack of dry air kit |
| Ink conductivity | Ink condition |

TABLE 5-continued

Example predictive faults for an industrial printer.

| Sensor Data | Potential Fault |
| --- | --- |
| Ink temperature | Reduce cooling air flow |
| Viscosity | Ink condition |
| Viscometer fill time | Restrictor blocking |
| Last chance filter pressure drop | Filter maintenance required |
| Ink filter pressure drop | Filter maintenance required |
| Pump speed | Pump wear |
| Pump Drive % | Pump wear |
| Electronics temp vs ambient temp | Air filter blockage |
| Head temperature vs ambient temp | Head heater failure |
| Flush pump speed | Flush Pump wear |
| Air pump speed | Air pump wear |
| Head vibration/shock | poor print quality, low uptime, customer abuse |
| Valve open time (v1-v8) | slow/lazy valves/sticking valves |
| Fume level | Vapor leak |
| PH cover time since last removed | Low uptime, Lack of print head maintenance |
| Number of missed prints | Photocell obscured or damaged |

The system can also be used to monitor the operation of a printer in comparison to best practice operation data. The best practice operation data relates to predetermined processes for operating and/or maintaining the printer. The best practice operation data may be determined from design data, historical data from a plurality of printers, or from other sources. For example, it might be known that after the printer has been down more than 24 hours, it is best to provide a "clean start" that cleans a portion of the print head, before printing begins. If the user executes a quick start instead, that action would not be in compliance with best practice data. As another example, if the printer has a failure due to a high voltage trip, the best practice may be to remove the print head cover, clean the deflector plates with solvent, and allow the parts to dry before going back to run mode. If the user does something different, it would not be in compliance with best practices. The processor uses the parameter data, the sensor data, and the best practice data to determine compliance of the operation of the printer with the best practice data. As another example, it is known that if too many clean starts are performed, the printer will transfer a lot of solvent into the mix tank, which will dilute the ink, changing its viscosity and potentially negatively affecting the operation of the printer such as print quality. Thus, if a user performs too many clean starts, this would not be in compliance with best practice data. Using historical data from a variety of printers it may be determined from sensor data for example what the best practice operation is.

According to some embodiments, the printer 110 includes the printer service client process 120, such as a control software program running on a processor of the industrial printer 110. The client process is configured to exchange data with a server process running on a different device and provides access to the data received by control process 180, and also issues instructions to the control process 180, e.g., by changing values in the user settings data structure 184 or by issuing commands to which the control process responds, such as a command issued by a user through the GUI 186, or commands for an application programming interface (API) of the control process 180.

The client server-model for interactions among separate processes is well known in the art. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, but not limited to those reasons.

A remote servicing system for an industrial printer includes at least one industrial printer 110 with a printer service client process 120 and a printer service server process on a separate host in communication with the client 120, e.g. through a local or wide area network, or some combination. The server is configured to use at least the sensor measurements and the user-set parameter values to determine any of at least a set of service related issues for the printer, and to determine a remedial action for the service issue and initiate the remedial action, e.g., by dispatching a service technician with the correct replacement component or by issuing a command to be executed by the printer, or by changing one or more of the user-set parameter values in data structure 184, or some combination.

One or more significant advantages accrue if the server process is at a different location from the industrial printer. For example, a printer service provider can reduce downtime at the production line facility of a customer using the printer by automatically informing the service provider's maintenance team or technical support of abnormal conditions and supplying the relevant information to address the problem. The service provider personnel can connect to and monitor the printer, to assess the issue and either provide corrective action remotely or dispatch an informed service technician with the correct parts to fix it right the first time. Real time performance display presentations (also called a "dashboard" hereinafter) provide key data about the printer, which can help the service provider pinpoint areas for improvement in the values of user-set parameter.

Thus, in some embodiments, a system includes multiple processors, an industrial printer configured to apply ink to a package on a production line, a communications network configured to support data communication among the plurality of processors, and at least one memory including one or more sequences of instructions. The at least one memory and the one or more sequences of instructions are configured to, with at least one processor, cause the system to obtain sensor data that indicates values output by corresponding sensors configured to measure physical phenomena related to one or more components of the industrial printer. The system is also caused to obtain parameter data that indicates values for corresponding user-set parameters that indicate user settings for operation of the industrial printer. The system is also caused to determine a service issue related to the industrial printer based on the sensor data and the parameter data. Even further, the system is caused to determine, at least in part, an action to be performed on the industrial printer in response to the service issue; and cause the action to be initiated.

Figure 1C:
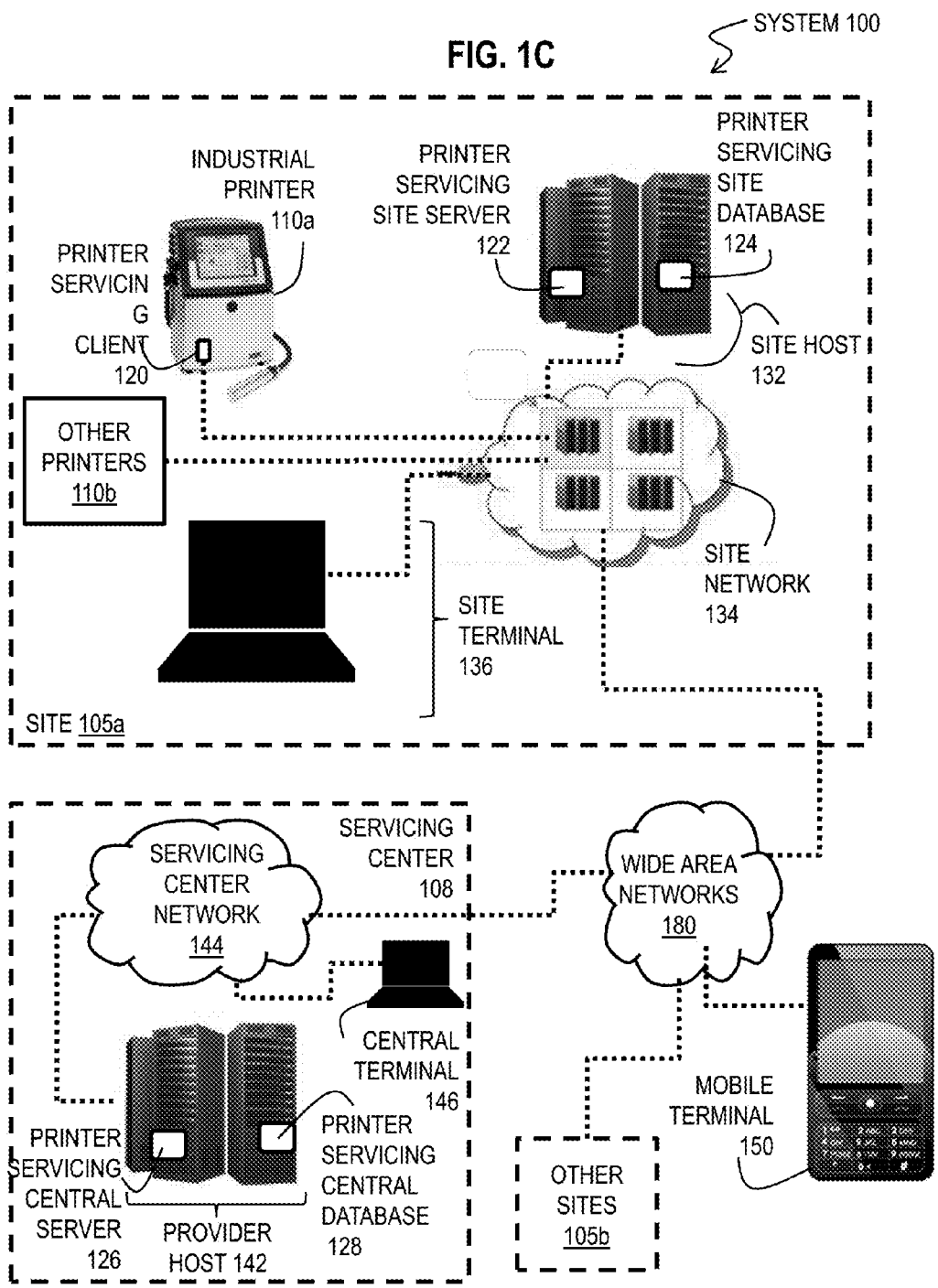
FIG. 1C is a block diagram that illustrates an example system for remote servicing of an industrial printer, according to one embodiment.

In some embodiments, the multiple processors are located at multiple facilities at corresponding multiple different locations; and, the industrial printer is at a particular facility of the multiple facilities. FIG. 1C is a block diagram that illustrates an example system 100 for remote servicing of an industrial printer, according to one embodiment. System 100 includes at least one industrial printer 110a at site 105a, such as one facility of a particular company, and at least one printer servicing server (e.g., printer servicing site server 122 on site host 132, or printer servicing central server 126 on provider host 142 at a remote service center 108 at a different facility), and at least one communications network (e.g., site network 134, or wide area network 180, or servicing center network 144, or some combination). A servicing operator interacts and controls the servers, in some embodiments, using an input device on the host (such as site host 132 or provider host 142), or on a separate terminal (such as site terminal 136 connected to site host 132 by the site network 134, or the central terminal 146 connected to the provider host 142 by the servicing center network 144). In some embodiments, the terminal used by the servicing operator is a mobile terminal 150, such as a smart phone, described below with reference to FIG. 12, connected to the server host through a wide area network 18 or in combination with one or more other networks, such as site network 134 or servicing center network 144.

According to an illustrated embodiment, the system is implemented on one or more networks e.g., site network 134, servicing center network 144 and wide area networks 180 as depicted in FIG. 1C. The networks include the Internet that is configured to switch data packets among terminals using the Internet Protocol (IP) and any of a variety of application level protocols, including the hypertext transfer protocol (HTTP) used to send World Wide Web pages between a World Wide Web client (called a Web browser, or, simply, a browser) and a World Wide Web server. Connected to the networks are several processes operating on hosts, including printer servicing client 120 on printer 110a and printer servicing site server 122 on host 132 and printer servicing central server 126 on host 142. In some embodiments, the terminals 136, 146 and 150 connect to the servers 122 or 126 using Web browsers by exchanging HTTP data packets to transfer the GUI of the dashboard and other web page screens, and transfer the operator response, if any, to the GUI of the dashboard and other screens.

In some embodiments, site 105a includes one or more other industrial printers 110b, and the printer servicing server (e.g., server 122 or server 126) uses one or more databases (e.g., printer servicing site database 124, or printer servicing central database 128, respectively, or some combination) to store data received from the printers 110a and 110b. In some embodiments, system 100 includes zero or more other facilities at other sites 105b, and the printer servicing central server 126 is configured to service printers from all the sites 105a and 105b.

Although processes, equipment, and data structures are depicted in FIG. 1B and FIG. 1C as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

FIG. 2 is a flow diagram that illustrates an example method 200 in an industrial printer for remote servicing of the printer, according to one embodiment. For example, method 200 is performed by printer servicing client 120 or the client 120 and control process 180 in some combination. Although steps are depicted in FIG. 2, and in subsequent flowcharts FIG. 3A and FIG. 3B, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, values for one or more environmental variables are determined. For example, values for a serial number for the printer is determined. As another example, the humidity of the ambient environment may be determined. In some embodiments, the data includes data that indicates one or more optional components that can be included in a printer. In some embodiments, the data includes data that indicates a network address for one or more processors on the printer, such as an Internet Protocol (IP) address or a version 6 of the IP address (IPv6 address). In some embodiments, values for all the environmental variables listed in Table 4 are determined, during step 201.

The values may be determined in any manner, such as: being received by a manual entry from a user in response to a prompt presented at a user interface, such as a graphical user interface; found included in the programming instructions; retrieved from a data structure on the local host or another host on a network, such as from one or more databases; received in a message from another host, either unsolicited or in response to a query; or some combination.

In step 202, the printer servicing client process discovers a printer servicing server on the network using any autodiscovery techniques known in the art. If several servers are discovered then one is selected, e.g., the nearest server that involves the fewest hops between network nodes. For example, printer servicing client 120 discovers printer servicing site server 122, if there is one; or, if not, then printer servicing client 120 discovers printer servicing central server 126.

In step 205, it is determined whether the discovered server is off site. If so then, in step 207, encryption is enabled for all communications with the server. If not, then encryption is not enabled. In some embodiments, encryption is always enabled; and, steps 205 and 207 are omitted. Any suitable encryption or security protocol known in the art may be used.

In step 209 a message is sent to the server, which includes data that indicates the printer serial number and network address in order to allow the server to be configured to communicate with the printer. In other embodiments, another identifier is used in lieu of the serial number to uniquely indicate the printer among all printers in the system.

In step 211, it is determined whether there are any software updates, e.g., by receiving an update from the server. If not, then control passes to step 215. If so, then in step 213 the software update is installed, and control passes then to step 215.

In step 215, it is determined whether there are any changes to the user-set parameter values (called "setting" for convenience hereinafter), such as those listed in Table 5, or changes to the values of any of the environmental variables, such as those listed in Table 4. For example, it is determined whether the user is inputting or has input a value for a user-set parameter through the GUI 186. If not, then control passes to step 221. If so, then in step 217 the current settings, or at least the changes to the current settings, and current values of the environmental variables, or at least the changes to those, such as the updated software version, are reported to the printer servicing server along with the identifier for the printer, such as the serial number. Control passes then to step 221.

In step 221, it is determined whether it is time to make a measurement with one or more sensors, such as those listed in Table 1. In various embodiments, the measurement times are selected in a range from about 0.1 seconds to about 60 seconds. In some embodiments, the measurement time depends on the sensor. For example, it is determined to make a set of measurements every 5 seconds, where the set includes at least a measurement from one of the sensors listed in Table 1. If not time to make a measurement, then control passes to step 225. If so, then in step 223 a measurement from a sensor is made for one or more sensor and the values recorded locally. Control passes then to step 225.

In step 225, it is determined whether it is time to report the measurements to the printer servicing server. In various embodiments, the measurement reporting times are selected in a range from about 1 second to about 10 minutes. For example, it is determined to report measurement every 30 seconds. If not time to report a measurement, then control passes to step 231. If so, then in step 227 the identifier for the printer, such as the serial number, and the measurements are reported to the printer servicing server in one or more messages. Any reporting protocol may be used. In some embodiments, the reporting protocol involves an acknowledgement. If an acknowledgement is not received in a certain time, then the measurements are reported again. In some embodiments, step 227 includes deleting, from the local storage, the values of the measurements just reported. Control passes then to step 231.

In step 231, it is determined whether an event has occurred, such as one of the faults or warnings listed in Table 2 or the other events listed in Table 3, such as a user initiated operation. If not, then control passes to step 235. If so, then in step 233 the identifier for the printer, such as the serial number, and the event are reported to the printer servicing server in one or more messages. Any reporting protocol may be used. In some embodiments, the reporting protocol involves an acknowledgement. If an acknowledgement is not received in a certain time, then the one or more messages are sent again. Control passes then to step 235.

In step 235, it is determined whether an command for the printer has been received from the printer servicing server in one or more message, such as a command to perform one of the user-initiated operations (e.g., nozzle flush) listed in Table 3. If not, then control passes to step 241. If so, then in step 237 the command is sent to the printer control process 180 to be executed. Control passes then to step 241.

In step 241, it is determined whether some end condition has been satisfied, such as loss of communications with the printer servicing server, or power down, or system crash. If not, then control passes back to step 211 and following steps, described above. If so, then the process 200 ends.

Figure 3A:
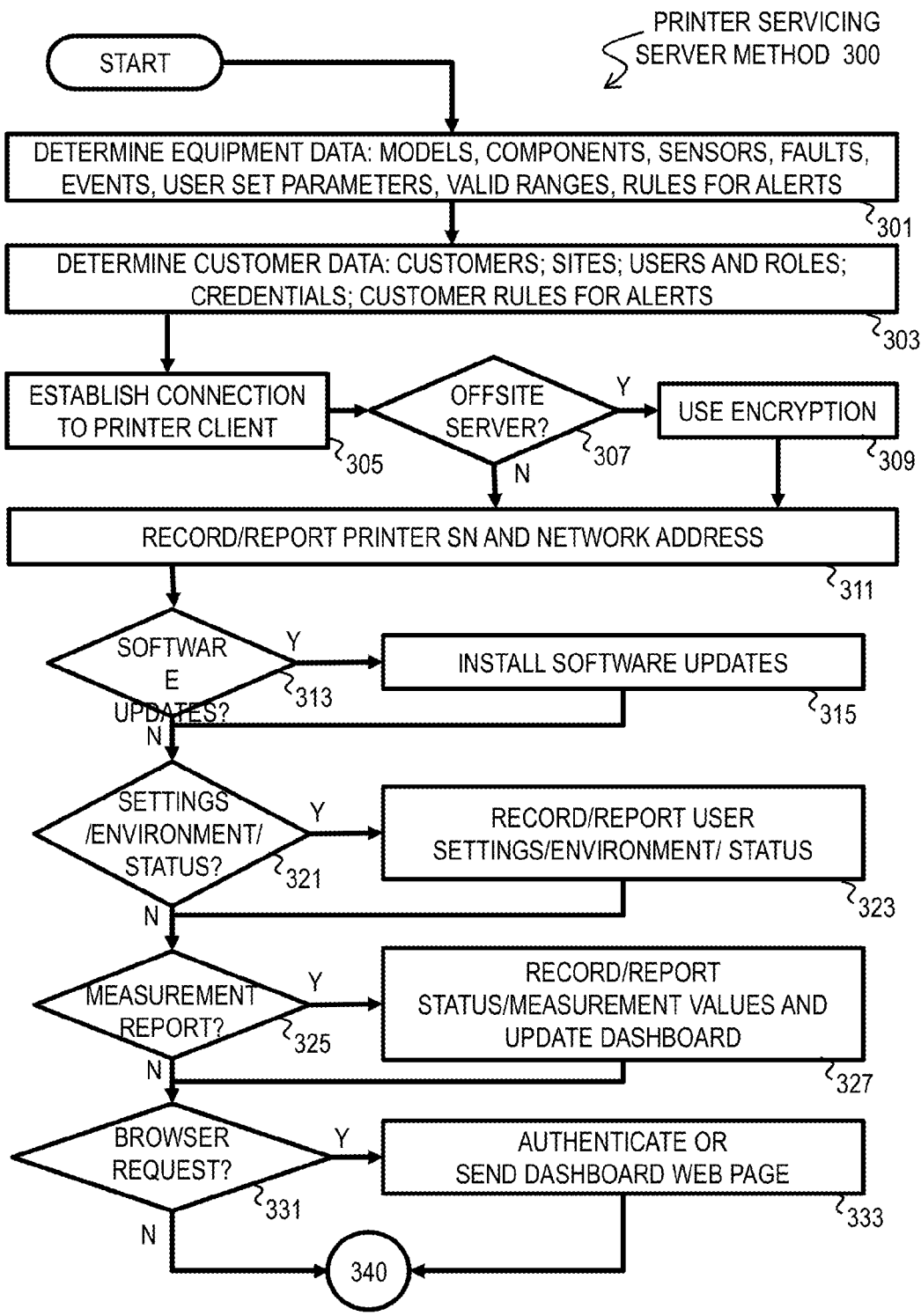

FIG. 3A and FIG. 3B compose a flow diagram that illustrates an example method 300 in a remote processor for remote servicing of the printer, according to one embodiment. For example, method 300 is performed by printer servicing site server 122 or printer servicing central serve 126, or some combination.

In step 301, equipment data is determined that indicates the various printers to be serviced remotely, such as printer manufacturer, printer model, components of each printer model, sensors for each component, faults and other events appropriate for each printer model or component or sensor, user set parameters for each printer mode, valid ranges for user-set parameters, valid ranges for components (to detect faulty components), valid ranges for sensors (to detect faulty sensors), and rules for alerts. Any method may be used to determine this data, as described above for step 201.

Alerts are notification messages sent to technicians of the printer service provider or to customers of the printer service provider, including technical support personnel, managers or officers, or some combination, when a problem is identified with a printer. Problems include failures or impending failures or risk of failure above a certain threshold of risk. Rules determine which alerts are sent to which personnel based on the data received from a printer, including data related to user-set parameters, sensor measurements, events and environmental variables. In some embodiments, rules are determined based on retrieving data from a notification rules data structure, described in more detail below with reference to FIG. 4. In those data structures a rule indicates persons who receive the notifications by role. The actual person in the role depends on the printer being serviced.

In step 303, customer data is determined that indicates the various users of the printers to be serviced remotely, such as, for each of one or more customers: customer identifier; facilities (sites) and associated locations (e.g., physical or network address or some combination); persons associated with the provider; persons associated with each printer for each customer; network credentials for persons gaining access to the printer servicing server; and alert notification roles for each person. Any method may be used to determine this data, as described above for step 201.

In step 306, network communication is established with each printer servicing client process 120, for example each printer servicing client process of a customer is added as that printer servicing client process discovers the server during step 202, described above. The server is configured to communicate with the printer. In some embodiments, step 305 includes establishing communications with another server. For example, site server 122 establishes communications with a higher level server, such as central server 126, e.g., using autodiscovery or by means of manual configuration.

In step 307, it is determined whether the discovered printer is not on a local network, e.g., the printer is off site. If so then, in step 309, encryption is enabled for all communications with the printer. If not, then encryption is not enabled. In some embodiments, encryption is always enabled; and, steps 307 and 309 are omitted. Any suitable encryption or security protocol known in the art may be used. In some embodiments, step 307 includes determining whether the other server is offsite. If so then, in step 309, encryption is enabled for all communications with the other server.

In step 311, the printer data received in the message from the printer, which includes data that indicates the printer identifier (e.g., serial number) and network address is recorded locally in a data structure in a computer-readable medium. If a higher level server is involved, then the identifier and network address of the printer is also reported to the other server. For example, if both site server 122 and central server 126 are involved in the system 100, then the site server 122 records the data in its computer-readable medium (e.g., in database 124) and reports the data to the central server 126, and the central server also records the data on its own computer-readable medium, (e.g., in database 128).

In step 313, it is determined whether there are any software updates since the version being used by the printer servicing client 120, e.g., based on the original message or a subsequent exchange of messages with the printer servicing client 120. If not, then control passes to step 321. If so, then in step 315 the software update is sent to the client for installation. In some embodiments, the data set includes an automatic install process, as is well known in the art. Then, control passes to step 321. In some embodiments, step 313 includes receiving software updates from a higher level server, if any.

In step 321, it is determined whether the current settings, or at least the changes to the current settings, and current values of the environmental variables, or at least the changes to those, are received from the printer servicing client 120 for a particular printer identified in the message or messages received. If not, control passes to step 325. If so, then in step 323 the settings are recorded by the printer servicing server (e.g., in a database 124 or 128), and if any higher level server, reported to the higher level printer servicing server, where it is also recorded. Control passes then to step 325.

In step 325, it is determined whether the identifier for the printer, such as the serial number, and the measurements are received from the printer servicing client 120 in one or more messages. Any reporting protocol may be used. In some embodiments, the reporting protocol involves an acknowledgement. If so, an acknowledgement is sent to the client 120. If no measurement message is received, control passes to step 331. If one or more measurement messages are received, then in step 327 the data is recorded by the printer servicing server (e.g., in a database 124 or 128), and if any higher level server, reported to the higher level printer servicing server, where it is also recorded. Control passes then to step 331.

In step 331, it is determined whether a browser request is received from a user at a terminal, such as site terminal 136 or central terminal 146 or mobile terminal 150. This is typically an HTTP message. If not, then the method is at point 340 linking to step 341 and following steps depicted in FIG. 3B. If an initial browser request is received from a user, then in step 333, the user is authenticated based on credentials of the user as determined in one or more authentication messages using authentication procedures well known in the art. If authenticated, then further browser requests are honored. For example, some browser requests identify a particular printer that is of interest. If the printer is one of the printers that is in communication with the server, then a web page GUI, called a dashboard, is generated and sent to the user in step 33. The dashboard presents data from the data collected for any of the printers being serviced by the method 300, as described in more detail below. Other GUI screens are also included. The GUI of the dashboard and other screens includes one or more active areas that can be selected by a user on their browser to cause the server to take one or more actions, including presenting different data for the same printer, data for a different printers, and a issuing a remote command to be executed by the printer. Step 333 includes responding to any request for presenting data from any printer for which the user is authorized. Requests to issue commands are handled in step 373 described in more detail below. Control passes then to step 341 through point 340.

In step 341, performance of the printer is predicted based on the values of the measurements, user-set parameters and environmental variables. For example, trends in measured values may be used with a Kaman filter, or with a curve fits, such as polynomial curve, or a curve of principal components, or to determine membership in a cluster associated with problems to predict one or more subsequent expected values. This may be combined with printer design data or data form a plurality of other printers. Based on those predictions, it is determined in step 343 whether there is a risk of a problem, such as failure of a sensor or component or misapplication of a setting. If so, control passes to step 351, described below, to determine whether to issue an alert. If not, control passes to step 345. In some embodiments, predictions are not made; and steps 341 and 343 are omitted, so control passes directly from point 340 to step 345.

In step 345, it is determined whether event data is received, which includes data that indicates the identifier for the printer, such as the serial number, and an identifier for the event, in one or more messages. Any reporting protocol may be used. In some embodiments, the reporting protocol involves an acknowledgement. If so, an acknowledgement is sent to the client 120. If no event message is received, control passes to step 355.

If one or more event messages are received, then in step 347 the data is recorded by the printer servicing server (e.g., in a database 124 or 128), and if any higher level server, reported to the higher level printer servicing server, where it is also recorded. Control passes then to step 351.

In step 351, it is determined if the event satisfies conditions for one or more alert notification rules. If not, control passes on to step 361, described below, to determine any remedial action. If conditions re satisfied for an alert, then in step 353 the alert is sent to the user based on the rule and the user roles, at one of the terminals associated with the user, e.g., site terminal 136, or central terminal 146, or mobile terminal 150, or some combination, using any terminal protocol known in the art. In some embodiments, the alert message includes a link to the dashboard GUI. In some embodiments, the message includes the credentials, associated with the user for automatic authentication. In additions, during step 353, in some embodiments, alert data is recorded by the printer servicing server (e.g., in a database 124 or 128), and if any higher level server, reported to the higher level printer servicing server, where it is also recorded. Control then passes to step 361, described below, to determine any remedial action.

In step 355, it is determined whether an error report is received, which includes data that indicates the identifier for the printer, such as the serial number, and an identifier for the error, in one or more messages. Any reporting protocol may be used. In some embodiments, the reporting protocol involves an acknowledgement. If so, an acknowledgement is sent to the client 120. In some embodiments, the error report is an out of channel report, e.g., a phone call or email to a technical support person at a terminal, e.g. site terminal 136 or central terminal 146 or mobile terminal 150; and, step 355 indicates a manual entry by the technical support person at the terminal. If no error report is received, control passes to step 371. If an error report is received, then in step 357 the error report is recorded by the printer servicing server (e.g., in a database 124 or 128), and if any higher level server, reported to the higher level printer servicing server, where it is also recorded. Control passes then to step 361 to determine remedial action, if any.

In step 361, remedial action to stave off the problem, whether predicted or actual event, alert or error report, is determined. In some embodiments, step 361 includes prompting a person in an expert role to provide or suggest the remedial action based on the current value or trends of the settings, environment or measurements or some combination. In some of these embodiments, step 361 includes giving the expert access to historical data, e.g., in database 124 or 128, of past problems and associated values of settings, measurements or environmental variable, or some combination, for either the given printer or from a plurality of other printers. For example, historical data includes time histories of values for settings, environmental variables and measurements and any associated faults or warnings or failures or customer error reports for each printer for extended periods of time, e.g., in a period of time range from about one month to about five years. In some embodiments, an expert system is used to determine automatically the associations between certain problems and values of settings or measurements or environmental variables, or some combination, based on the historical data. In some embodiments, during step 361, the remedial action determined is recorded in the data base for the printer; and, if there is a higher level server, reported to the higher level server.

In step 363, it is determined if the remedial action includes one or more manual steps, such as replacing an ink cartridge. If so, then in step 365 a message or instruction is sent to a person in an appropriate role (e.g., user or on-site technician or remote site technician at a terminal, e.g., site terminal 136, central terminal 142 or mobile terminal 150) to instruct that person to perform the one or more manual steps of the remedial action, thus causing the system 100 to initiate the action. The instructions may include showing an instructional video on the interface of the printer. The printer may also query a user to obtain additional data that is lacking from the sensor data, such as that may be observed buy the user (for example, if fluids are visibly leaking from a portion of the printer). Control then passes to step 367 to determine if there are automatic steps that can be performed by the control process 180. If it is determined in step 363 that no manual steps are involved in the remedial action, control passes directly to step 367.

In step 367, it is determined if the remedial action includes one or more automatic steps that can be performed by the control process 180 (called controller in FIG. 3B), such as performing a nozzle flush or other operations listed in Table 3, or that can be performed by the printer servicing client 120, such as resetting a value or a user-set parameter listed in Table 5, such as message height. If so, then in step 373 a message is sent to the printer servicing client 120 to change a value of a user-set parameter, or a command is sent to the control process 180, thus causing the system 100 to initiate the action. Control then passes to step 381 to determine if end conditions are satisfied. If no remedial action involves automatic steps, or if no remedial action is determined, then control passes directly to step 381.

If it is determined in step 355 that there is no error report, then control passes to step 371. In step 371, it is determined whether a command is received from a GUI of the dashboard or other screen operated by a user at a terminal that involves performing an automatic action or resetting a value for one or more user-set parameters. If so, then control passes to step 373, described above to cause the system to initiate the action. If not, control passes to step 381.

In step 381, it is determined whether some end condition has been satisfied, such as loss of communications with the printer or printer servicing client, or power down, or system crash. If so, then the process 300 ends. If not, then control passes back to step 313 to determine if there are software updates for a printer, and following steps, described above. In some embodiments, step 318 includes determining whether a message is received from another printer no previously communicating. If so, then end conditions are not met; but, control passes back to step 305 to establish communications with the new printer instead of passing to step 313 to check for software updates for the printer.

Thus, FIG. 3 illustrates an example method that includes obtaining, on a processor, sensor data that indicates a first plurality of values output by a first corresponding plurality of sensors configured to measure physical phenomena related to a plurality of components of an industrial printer. The method also includes obtaining, on the processor, parameter data that indicates a second plurality of values for a second corresponding plurality of parameters that indicate user settings for operation of the industrial printer. Still further, the method includes determining, on the processor, a service issue (such as a predicted problem or actual fault or warning or error report or some combination) related to the industrial printer based on the sensor data and the parameter data. Yet further, the method includes determining, at least in part on the processor, an action (such as a remedial action or lack thereof) to be performed on the industrial printer in response to the service issue; and, causing the action to be initiated.

Figure 4:
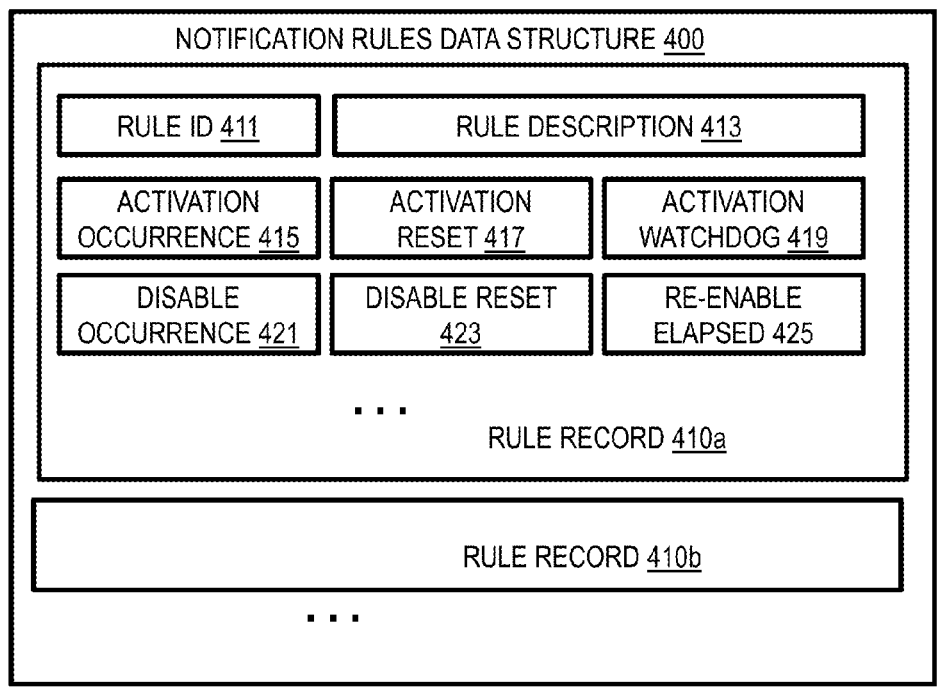
FIG. 4 is a block diagram that illustrates an example data structure for notification rules, according to one embodiment.

FIG. 4 is a block diagram that illustrates an example data structure 400 for notification rules, according to one embodiment. The data structure includes a record for each alert notification rule, such as rule record 410a and rule record 410b, among others indicated by ellipsis. Each rule record includes a number of fields that hold data that indicates a property of the rule. In the illustrated embodiment, rule ID field 411 holds data that indicates a unique identifier for a rule. The rule description field 413 holds data that indicates a verbal description for the rule that is readily understood by a user of the system 100.

To understand the other properties of the rules, consider the 8 example rules, with identifiers 1 through 8, respectively. Rule 1: Notify after 1 occurrence of event, do not retrigger for 30 minutes. Rule 2: Notify after 1 occurrence of event, do not retrigger for 1 day. Rule 3: Notify after 3 occurrences in 30 minutes, at least 5 minutes between occurrences. Rule 4: Notify if active for more than 15 minutes. Rule 5: Notify if active for more than 30 minutes. Rule 6: Notify if active for more than 1 day. Rule 7: Notify after 3 occurrences in 1 hour, do not retrigger for 2 hours. Rule 8: Notify after 1 occurrence, do not retrigger for 1 day.

The activation occurrence field 415 holds data that indicates how many times the event has to occur before activating an alert notification. For example, the value indicated by field 415 would be 1 for Rules 1, 2 and 8; would be a null value for rules 4, 5 and 6; and would be 3 for Rules 3 and 7. The activation reset field 417 holds data that indicates how long to wait before incrementing the number of occurrences. For example, the value indicated by field 417 would be 5 minutes for Rule 3 and null for the other rules. The activation watchdog field 419 holds data that indicates how much time the event must persist or within which the number of occurrences should be accumulated. For example, the value indicated by field 419 would be 15 minutes for Rule 4, 30 minutes for Rule 3 and Rule 5, 1 hour for Rule 7, 24 hours for Rule 6, and null for Rules 1, 2 and 8.

The disable occurrence field 421 holds data that indicates the number of occurrences after which a disable clock should start tracking time. For the example rules, the value indicated in field 421 match those in field 415. The disable reset field 423 holds data that indicates when the disable function is reset. For the example rules, the value indicated in field 423 is null for all 8 rules. The re-enable elapsed field 425 holds data that indicates the elapsed time after the disable clock starts running, that events can be accumulated or timed again (called "retriggered"). For example, the value indicated by field 423 would be 0 minutes for Rule 4, 5 and 6; would be 30 minutes for Rule 1 and 3; would be 2 hours for Rule 7; and, would be 24 hours for Rule 2 and Rule 8.

Other fields in each rule record that may be used in other embodiments are indicated by ellipsis inside record 410a. For example, in some embodiments, the ellipsis indicate a set of fields that list the events to which the rule applies and the roles of the persons to be notified when an alert notification rule is satisfied for that event. In other embodiments, such lists are included in different data structures.

Figure 5:
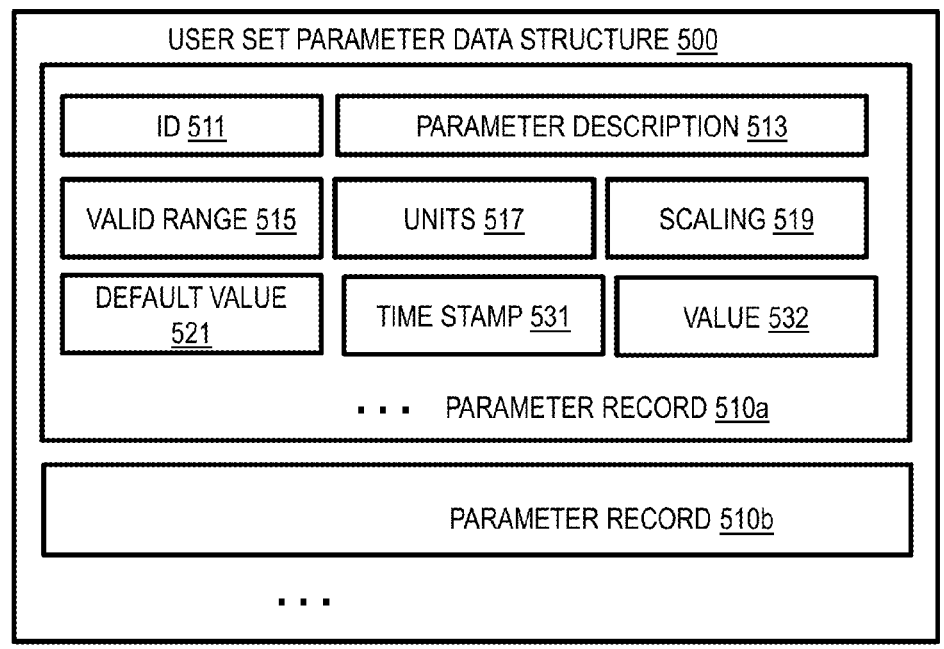
FIG. 5 is a block diagram that illustrates an example data structure for user-set parameters, according to one embodiment.
Figure 6:
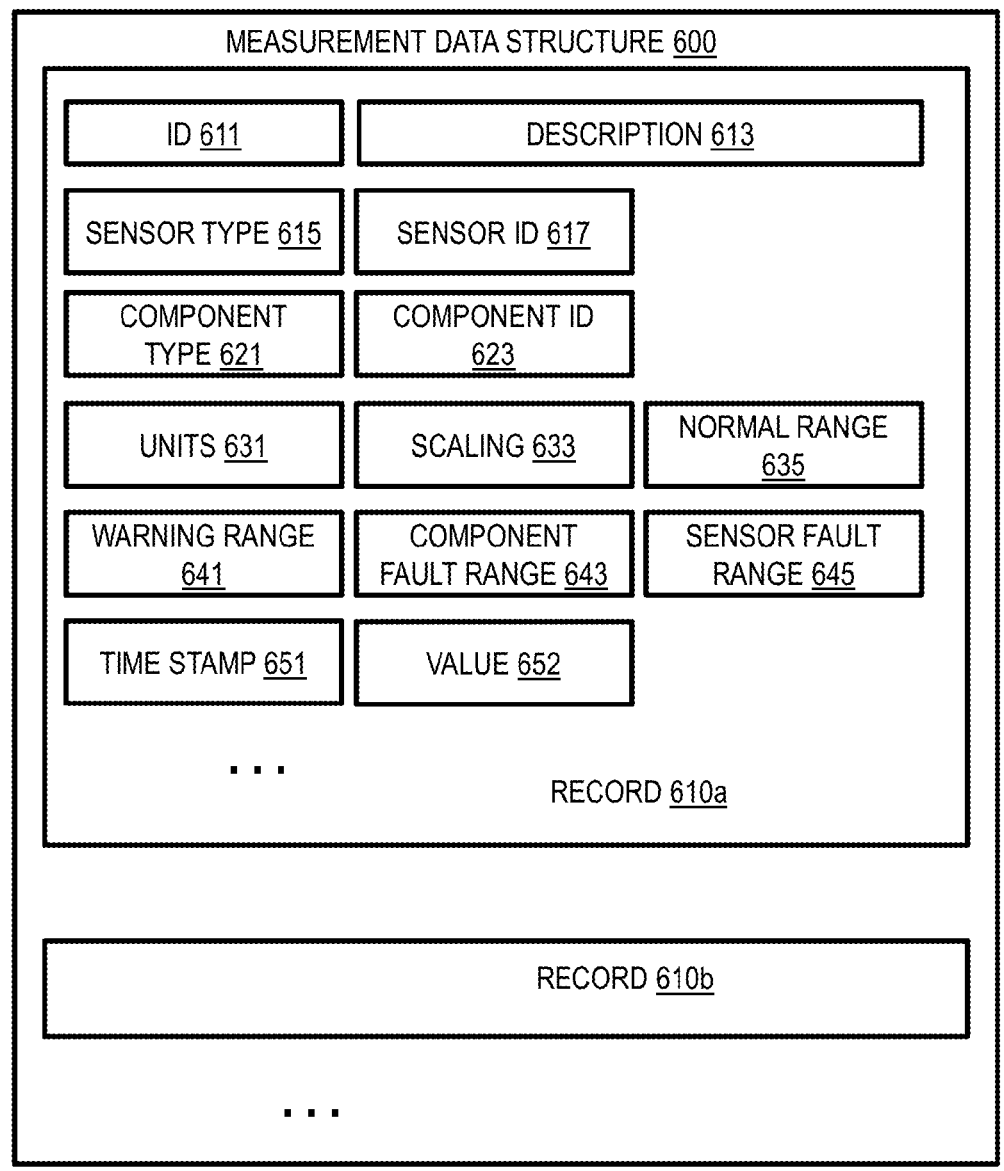
FIG. 6 is a block diagram that illustrates an example data structure for sensor measurements, according to one embodiment.

In general, although data structures, and fields are depicted in FIG. 4, and subsequent diagrams in FIG. 5 and FIG. 6, as integral blocks in a particular order for purposes of illustration, in other embodiments, one or more data structures or fields, or portions thereof, are arranged in a different order, in the same or different number of data structures or databases in one or more hosts or messages, or are omitted, or one or more additional fields are included, or the data structures and messages are changed in some combination of ways.

FIG. 5 is a block diagram that illustrates an example data structure for user-set parameters, according to one embodiment. The data structure includes a record for each user-set parameter, such as parameter record 510a and parameter record 510b, among others indicated by ellipsis. Each user-set parameter record includes a number of fields that hold data that indicates a property of the parameter. In the illustrated embodiment, ID field 511 holds data that indicates a unique identifier for the parameter, such as a parameter name. The parameter description field 513 holds data that indicates a verbal description for the parameter that is readily understood by a user of the system 100.

The valid range field 515 holds data that indicates one or more values or ranges of values within which a user may select a value for the parameter. The units field 517 holds data that indicate the physical dimensions represented by the parameter. The scaling field 519 holds data that indicates how to generate the physical dimensions represented by the parameter from the values stored, such as multiplicative factor or additive factor or a logarithmic function or exponential function or polynomial function or other function, or some combination. The default value field 521 holds data that indicates a value used initially or in the absence of a value input by a user.

The time stamp field 531 holds data that indicates a time when the user sets a value for the parameter. The value field 532 holds data that indicates the use selected value. The ellipsis within the record 510a indicates other fields in the record, such as subsequent time stamp and value fields inserted when a user changes the value of the user-set parameter.

FIG. 6 is a block diagram that illustrates an example data structure for sensor measurements, according to one embodiment. The data structure includes a record for each measurement type, such as record 610a and record 610b, among others indicated by ellipsis. For example record 610a is for head temperature measurements, and record 610b for nozzle temperature measurements. Each sensor record includes a number of fields that hold data that indicates a property of the measurement type, including actual measurement values collected. In the illustrated embodiment, ID field 611 holds data that indicates a unique identifier for the measurement, such as a programming variable name. The measurement description field 613 holds data that indicates a verbal description for the measurement type that is readily understood by a user of the system 100.

The sensor type field 615 holds data that indicate a sensor type used to collect the measurement type, such as a thermostat or thermocouple of a certain model to measure a head temperature. The sensor ID field 617 holds data that indicates a unique identifier for a sensor, such as its serial number. In some embodiments, field 617 includes a time and sensor identifier to indicate each time a different sensor is placed or replaced in the printer. The component type field 621 holds data that indicate a component type that the sensor is measuring such as a print head or nozzle of a certain model. The component ID field 623 holds data that indicates a unique identifier for a component, such as its serial number. In some embodiments, field 623 includes a time and component identifier to indicate each time a different component of that type is placed or replaced in the printer.

The units field 631 holds data that indicate the physical dimensions represented by the measurement, such as temperature in degrees Celsius. The scaling field 633 holds data that indicates how to generate the physical dimensions represented by the measurement from the values stored, such as multiplicative factor or additive factor or a logarithmic function or exponential function or polynomial function or other function, or some combination. For example, if the temperature is stored as an integer that is 1000 times the actual temperature, then the multiplicative factor is $\frac{1}{1000}$.

The normal range field 636 holds data that indicates one or more values or ranges of values within which a measured value will not raise a warning or fault. The warning range field 641 holds data that indicates one or more values or ranges of values within which a measured value will raise a warning that something is wrong or about to go wrong. The component fault range field 643 holds data that indicates one or more values or ranges of values within which a measured value will indicate that the component is faulty and should be operated differently or repaired or replaced. The sensor fault range field 645 holds data that indicates one or more values or ranges of values within which a measured value will indicate that the sensor itself is faulty and should be repaired or replaced.

The time stamp field 651 holds data that indicates a time when the measurement is made. The value field 652 holds data that indicates the measured value. The ellipsis within the record 610a indicates other fields in the record, such as subsequent time stamp and value fields inserted when another measurement of the type is collected.

Figure 7:
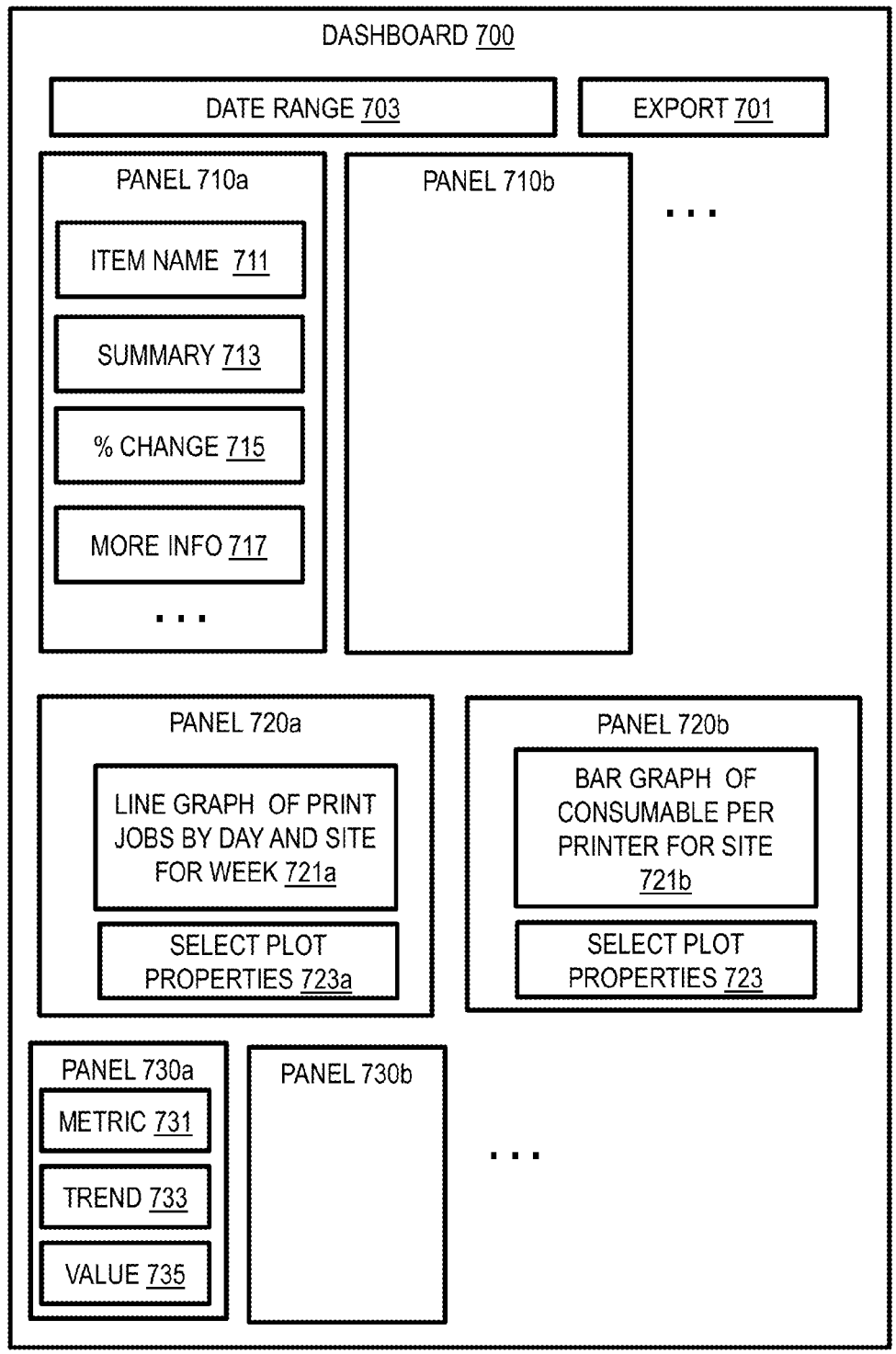
FIG. 7 is a block diagram that illustrates an example user interface (called a dashboard) for remote monitoring of printer, according to one embodiment.

FIG. 7 is a block diagram that illustrates an example user interface 700 (called a dashboard) for remote monitoring of printer, according to one embodiment. Thus, FIG. 7 is a diagram that illustrates an example screen on a display device of a terminal in the system 100, such as site terminal 136, central terminal 142 and mobile terminal 150, according to one embodiment. The screen includes one or more active areas that allow a user to input data to operate on data. As is well known, an active area is a portion of a display to which a user can point using a pointing device (such as a cursor and cursor movement device, or a touch screen) to cause an action to be initiated by the device that includes the display. Well known forms of active areas are standalone buttons, radio buttons, check lists, pull down menus, scrolling lists, and text boxes, among others. Although areas, active areas, windows and tool bars are depicted in FIG. 7 as integral blocks in a particular arrangement on particular screens for purposes of illustration, in other embodiments, one or more screens, windows or active areas, or portions thereof, are arranged in a different order, are of different types, or one or more are omitted, or additional areas are included or the user interfaces are changed in some combination of ways.

The information and active areas on the dashboard are designed to allow a technician (i.e. the remote user) to detect or diagnose a problem or other servicing issue for a printer and determine any remedial action. Data range area 703 presents text or graphics that indicates a date range for the information presented in the other areas. In some embodiments, area 703 is an active area that depicts a calendar that allows a user to select a different date range start or end date. Export area 701 is an active area that allows a user to export data presented on the dashboard to another computer application program, such as a spreadsheet or slide show or word processing program. In some embodiments, a pull down menu to select a site and a printer at the sight is included elsewhere on the dashboard. In some embodiments, the printer to be characterized on the dashboard is selected on a different screen.

The dashboard includes multiple summary panels 710a, 710b among others indicated by ellipsis (collectively referenced as summary panels 710), graph panels 720a, 720b and optionally others (collectively referenced as graph panels 720), and trend panels 730a, 730b among others indicated by ellipsis (collectively referenced as trend panels 730).

Each summary panel 710 gives a current or average value of one measurement type, e.g., from one sensor, or of a quantity derived from one or more measurement types for a particular printer selected in export area 711 for the date range indicated in data range area 713. For example, each panel includes an item name area 711, a summary area 713, a % change area 715, and a more info area 717, among zero or more others indicated by ellipsis.

The item name area 711, presents data that indicates the name or description or other identifier for the sensor measurement or derived quantity, e.g., as text of a particular font, size and color. In some embodiments, the item name area 711 is an active area that can be selected to scroll to a different measurement or derived quantity.

The summary area 713, presents data that indicates the current value or average value or other statistical value of the sensor measurement or derived quantity, e.g., as numerals of a particular font, size and color that differ from that of the item name area 711 in some embodiments.

The % change area 715, presents data that indicates the percent change in the sensor measurement or derived quantity over the date range 703, e.g., as numerals of a particular font, size and color that differ from that of the item name area 711 in some embodiments.

The more info area 717, is an active area. When selected by a user, the panel 710a is replaced with a list of related information, such as sensor ID, date the sensor was installed, component ID, date the component was installed, or statistic used to compute the value in the summary area 713, among other information, or a graph, or some combination.

Each graph panel 720 presents a graph of that provides context for the printer, by showing a trace for the subject printer against other printers at the same site. For example, panel 720a includes an area 721a with a line graph of print jobs by day for a week for the subject printer and zero or more other printers at the same site. An active area 723a allows a user to select properties for the plot, such as the type of graph (line, bar, pie chart, scatter, etc), which printers to display, how many days or categories to display and symbols or colors or line types to be used to represent each printer. In the illustrated embodiment, the graph panel 720b includes an area 721b with a bar graph of consumable usage (e.g., ink and makeup fluid) for the subject printer and zero or more other printers at the same site. An active area 723b allows the user to select properties for the plot, such as the type of graph (line, bar, pie, scatter, etc), which printers to display, how many days or categories to display, and symbols or colors or line types to be used to represent each printer. For example, in some embodiments, a user can select a pie chart of number of occurrences of each of multiple event types for one or more printers.

Each trend panel 730 presents a graphical trend for a metric, such as any measured value from a sensor, or any user-set parameter value or any environmental value or any event for a particular printer selected in export area 711 for the date range indicated in data range area 713. For example, each panel 730 includes a metric identifier area 731, a trend graph area 733, and a value area 735, among zero or more others.

The metric area give a name or other identifier for the metric being displayed. In some embodiments it is an active area that the user can operate to select a different metric. The trend area 733 presents a graph of the trend, in some embodiments, without a horizontal or vertical axis. In some embodiments, the trend graph includes only points during the date range of area 703. In other embodiments, the trend graph shows the summary value for the date range and the summary values for two or more previous and contiguous date ranges of approximately equal duration. The value areas show the current value of average value over the date range of area 703.

Thus the dashboard allows a user at a terminal, removed from the printer, to determine the relative state of each of one or more printers at each of one or more sites, and to detect or diagnose any service issue. In some embodiments, the dashboard also provides an active area so a user at a terminal, removed from the printer, can issue a command or suggest an operation to be performed at the printer.

Thus, the dashboard shows information about one or more printers to the remote user. It allows a remote user to easily find and view parameters or other settings of the one or more printers. It allows the user to review the event history for the printer. The event history may include faults, warnings, information events, and parameter changes (for example, by an operator). Thus, the remote user can see, for example, if an operator may have changed parameters of the printer which may have contributed to a fault, failure, or other change in performance of the printer. The dashboard also allows a user to graphically represent these values to try to visualize correlations between the various data. Other data available to the user includes sensor readings and out of range warnings. Thus, for example, a user can try to find correlations in values that precede a fault to try to predict when a fault will occur again the future, in order to then take preventive steps to avoid the fault. For example, if a nozzle failure typically occurs when the temperature is above a certain value and the printer has been running for a certain period of time, a user may ascertain that a nozzle flush needs to be performed under those conditions before the nozzle fails. The remote user can also view the GUI for the remote printer and operate the controls for the remote printer via the GUI of the remote printer.

2. Example Embodiments

According to an example embodiment, a Plant Server (e.g., printer servicing site server 122) and some minimal networking gear (site network 132) is installed at each plant (site 105a), but this is expected to be an off the shelf personal computer (PC). The service provider is prepared to supply the PC or provide required specifications so that the customer may supply their own PC. The service provider is also prepared to supply appropriate networking gear or specifications. The networking gear is expected to be limited to hubs, routers and patch cables. There are two use embodiments. In a Cloud Remote Service embodiment, the customer agrees to provide data to the remote service provider server (printer servicing central server 126) from the Plant Server (122); and both the customer and the service provider access web pages with the dashboard on the printer servicing central server 126 via the cloud (a collection of networks, including the public Internet). The customer is restricted to viewing their own data. In the second, Local Remote Service embodiment, the customer retains data at Plant Server (e.g., printer servicing site server 122) and the customer accesses web pages on the Plant Server via the local Plant network (e.g., site network 134).

Figure 8:
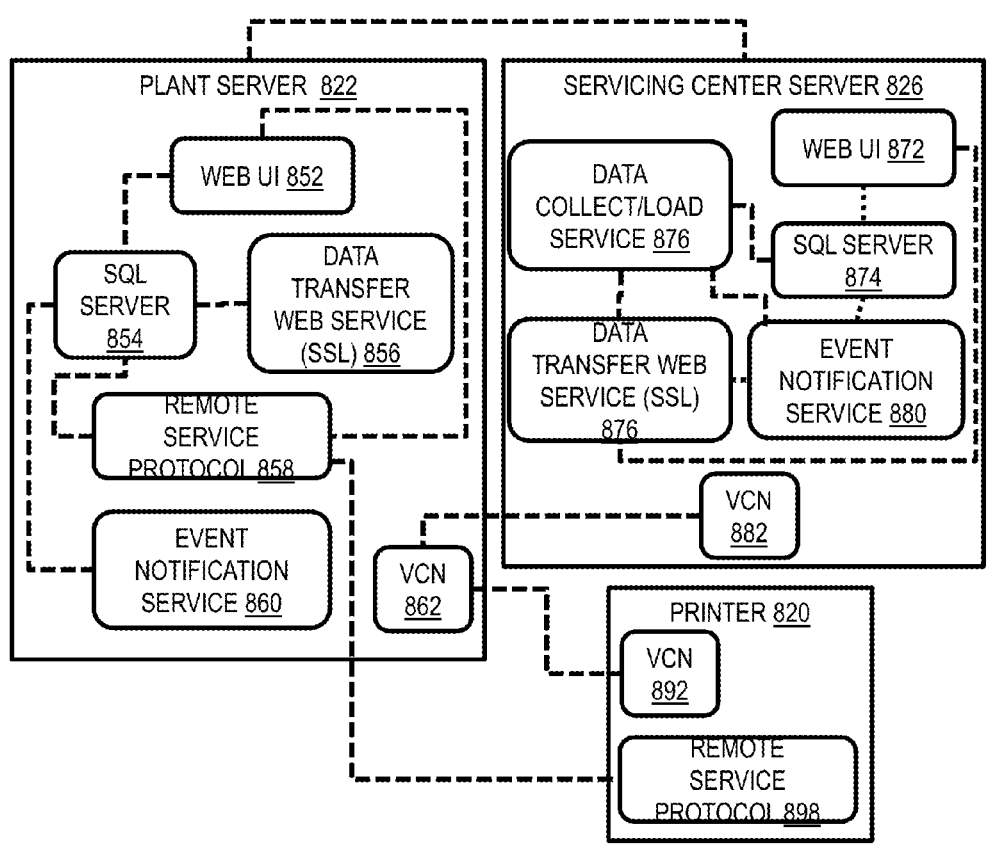
FIG. 8 is a block diagram that illustrates example modules for remote servicing of printer, according to one embodiment.

FIG. 8 is a block diagram that illustrates example modules for remote servicing of one or more printers, according to one embodiment. The architecture of this embodiment of a remote printer servicing system is shown based on the Remote Service product. The printer 820 is one embodiment of printer 110; plant server 822 is one embodiment of printer servicing site server 122; and, servicing center server 826 is one embodiment of printer servicing central server 126.

The servicing center server 826 uses a management portal designed as a standard n-tier .NET application with a web-based front-end, using ASP.NET MVC and C# as the back-end languages. The cloud based offering will be multitenant architecture. Remote Service product is supported on the following OS platforms: Windows Server 2008 R2 & 2012; Windows 7; and, Other MicroSoft (MS) platforms that can support .NET 4.5 Framework, IIS, and MS standard query language (SQL) Server Express.

The user interface is implemented via web pages (Web UI) 852 on plant server 822 and 872 on center server 826. The pages will be responsive design. This enables the application to be optimized for smartphones, tablets and desktop browsers without building separate user interfaces. The Web UI can be simultaneously accessed by multiple browser clients. Support browsers include Internet 8 and above, Chrome, Safari and Firefox. Terminals supported include a PC, a Mac, an iOS mobile device and an Android mobile device.

The database for the plant server (e.g., database 124) is SQL Express. The data base for the servicing center server (e.g., database 128) is SQL Server (e.g., 854 on plant server 822 and 874 on servicing center server 826). The databases use an extensible schema entity-attribute-value model, such as extensible markup language (XML), such that new sensors, data points, and events may be added, stored and reported without additional programming.

User authentication is based on Active Directory/SAML for user management and authentication for printer service provider employees who logon with their existing credentials. Customer accounts are setup and administered using a printer service provider supplied application on the Plant Server 822. Their credentials are stored in the application database. Permission are role-based, with at least the following roles: printer service provider; customer administrator; customer maintenance; and, user.

In this embodiment, all sensitive information is encrypted using Triple-DES or an equivalent FIPS 140-2 compliant algorithm. The current sensitive information is customer Company Name and Job Name. Passwords are stored using one-way SHA hashes.

WSO2 is used to securely transmit the data from the Plant Server 822 to the servicing center server 826 using a minimum of 256 bit secure socket layer (SSL, as depicted in FIG. 8 as data transfer web service (SSL) 856 on the plant server 822 and data transfer web service (SSL) in the servicing center server 826. Data format is extensible and loosely-typed to allow new data points to be added without a new web service.

The printer servicing client 120 includes a remote service protocol 898 on printer 820 to communicate data and receive commands with remote service protocol 858 on the plant server 822. This protocol negotiates a secure handshake, using challenge response, with the Plant Server 822 before transmitting data. This will defeat a competitor who attempts to capture data from the customer printers using this new protocol. This protocol will also allow the service provider to add remote service to printers that are already connected to intelligent applications exploiting the existing WSI/ESI protocol. The protocol will allow the printer 820 to auto discover the Plant Server 822. The client 120 in this embodiment determines the serial number for the printer, e.g., by requiring user configuration of the printer. The printer remote service protocol 898 does not transmit data if the serial number has not been configured.

All data transmissions are validated using checksums. Data is not saved or buffered on the printer during network outage event. Data may also be lost as a result of competition between multiple, near simultaneous events. The plant server 822 stores all data for up to 90 days then deletes it; while, the servicing center server 826 archives data after 90 days.

Users will be able to view/operate the printer interface remotely using VNC, a commercial remote operation product. Thus a VCN module 892 is included on the printer 820, a VCN module 862 is included on the plant server 822, and a VCN module 882 is included on the servicing center server 826. These modules allow a user at a terminal and logged into one of the servers to view and change user-set parameters on the printer, initiate various printer actions, and view diagnostic screens meant for the printer GUI.

In this embodiment, alerts are delivered via email. The content of the alert message(s) includes company, plant, serial number of printer, and printer model, a translated notification of a fault, warning or other information and time of occurrence. The alert also contains a link that navigates the user (after authentication) to the dashboard of the reporting printer. All alerts are based on a combination of a fault/warning and a rule, as described above. Rules are created by the printer service provider and manually entered into the application database. Users are able to configure email address where alerts are delivered. Users are able to filter alerts based on work hours. Administrators are able to assign rules to other roles. Recommended rule to role mapping is provided by the printer service provider. Alerts are delivered from the server within 5 minutes of receipt. The server will send alerts individually, without consolidation of multiple alerts.

The web page interface are generated in English but constructed to be language independent. All strings will be externalized to XML files that may be easily translated. The web pages will allow the user to dynamically change language. Other localization settings will be automatic, e.g., based on location of user.

Users log onto the web portal by name and password, and search for a printer by account (e.g. company), site (e.g., plant) and serial number of the printer at the site. These options are presented in an active area, such as a scroll down menu. Users are able to view summary and detailed reports on printer statistics, metrics and sensor data. The dashboard screen provides an overview of key data and metrics, as illustrated in FIG. 7. Data detail can be requested from the dashboard and presented as tables, averages or graphs, as shown in the following figures. All charts and tables are generated using interactive reporting UI components, to allow such features as sorting by clicking on column headings, searching and filtering.

FIG. 9A is a block diagram that illustrates example printer environment variables display elements (e.g., for use with dashboard) for remote monitoring of printer, according to one embodiment. FIG. 9A depicts screen 901 that is launched from the dashboard screen of FIG. 7. The printer service provider logo is presented in vendor logo area 910. The type of display is presented in display name area 911, which depicts the name "Environment Snapshot." The customer, customer site, printer model and serial number of the printer selected in a previous screen are presented in area 912*a*, area 912*b*, area 912*c* and area 912*d*, respectively. The example contents of these areas are "company", "Plant", "model" and "serial number," respectively, in the example embodiment illustrated. The area 918 presents data that indicates when the data was last update along with a label to that effect.

Screen 901 presents names of environmental variables and some associated sensor measurements and the corresponding values, grouped into different categories displayed in corresponding panels. Panel 914*a* presents names and values for an Ink data category that includes serial number, type, bottle size, lot info, best used date, required makeup type, fill level and number of times inserted for an ink cartridge currently in the subject printer. Panel 914*b* presents names and values for a raster category that includes raster 1 through raster 8 and indicates an operation status of each raster in the print head (e.g., operational or not). Panel 914*c* presents names and values for a Makeup data category that includes serial number, type, bottle size, lot info, best used date, required makeup type, fill level and number of times inserted, and zero vacuum point for a makeup fluid cartridge currently in the subject printer. Panel 914*d* presents names and values for a Core data category that includes serial number, model, pump run hours and birthdate of a core component in the subject printer. Panel 914*e* presents names and values for an Install data category that includes software version, firmware version, build version, WinCE operating system version, number of print heads, charge table version, nozzle frequency currently set, nozzle size, and special print mode currently set for the subject printer.

Figure 9B:
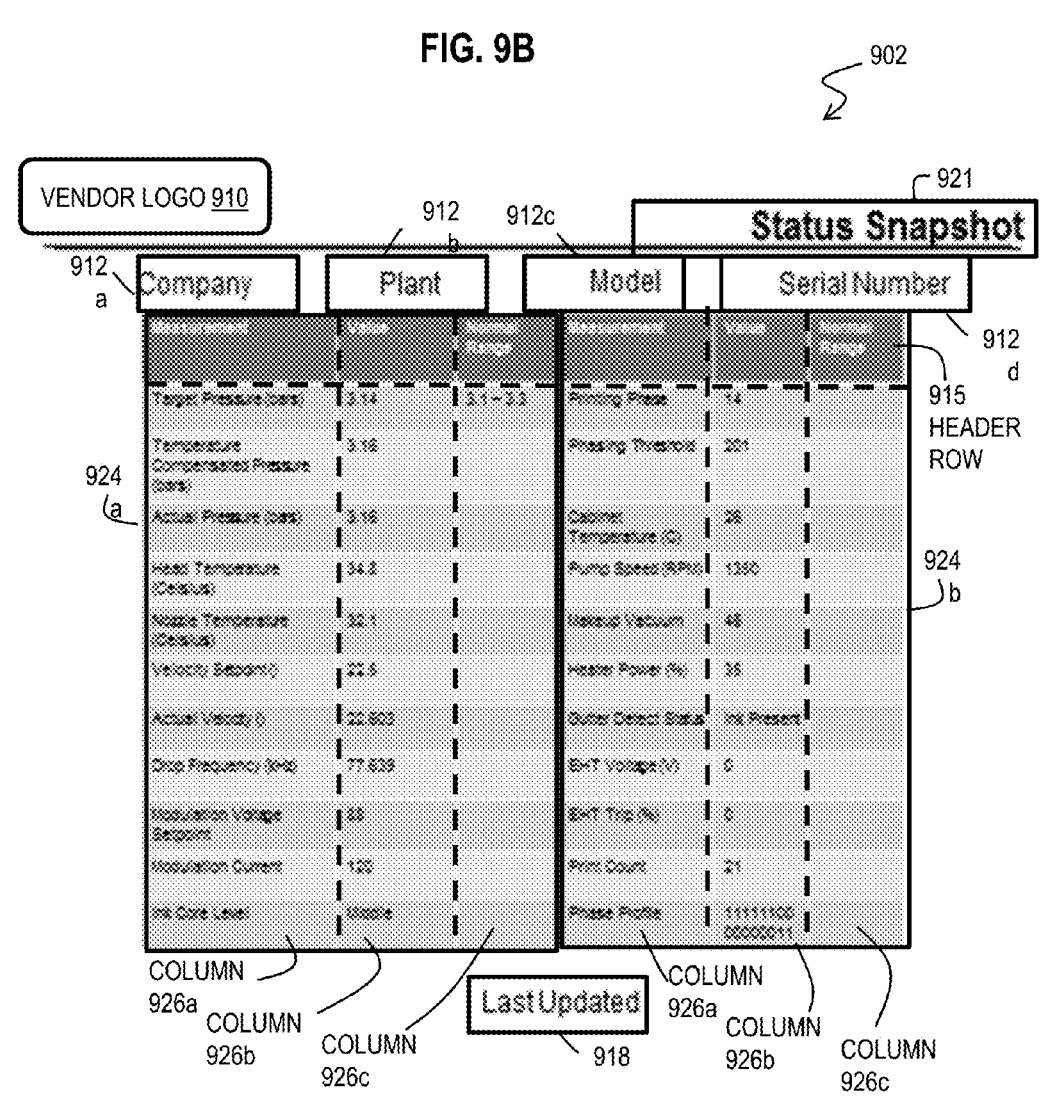

FIG. 9B is a block diagram that illustrates example printer measurements display elements (e.g., for use with dashboard) for remote monitoring of printer, according to one embodiment. FIG. 9B depicts screen 902 that is launched from the dashboard screen of FIG. 7. Area 910, area 912*a*, area 912*b*, area 912*c*, area 912*d*, and area 918 are as described above. The type of display is presented in display name area 921, which depicts the name "Status Snapshot," and refers to a special subset of sensor measurements.

Screen 902 presents names of the sensor measurements in the special subset and the corresponding values, arranged in two panels 924*a* and 924*b*, collectively referenced hereinafter as panel 924. Panel 924 presents name and units in column 926*a*, and current value in column 926*b*, and a normal range in column 926*c* for each of the subset of sensor measurements, including target pressure in bars, temperature compensated pressure in bars, actual pressure in bars, head temperature in Celsius scale, velocity set point, actual velocity, drop frequency in kilohertz, modulation voltage set point, modulation current, ink core level, printing phase, phasing threshold, Cabinet temperature in Celsius scale, pump speed in rotations per minute (RPM), makeup vacuum, heater power in percent, gutter detect status (ink present or not), EHT voltage in volts, EHT trip in percent, print count, and phase profile (which rasters on during each phase).

FIG. 9C is a block diagram that illustrates example printer events log display elements (e.g., for use with dashboard) for remote monitoring of printer, according to one embodiment. FIG. 9C depicts screen 903 that is launched from the dashboard screen of FIG. 7. Area 910, area 912*a*, area 912*b*, area 912*c*, and area 912*d* are as described above. The type of display is presented in display name area 931, which depicts the name "Events History." Events History includes faults, warnings, information events, and parameter changes.

Screen 903 presents list of events in chronological order, arranged in panel 934. The time interval of the event list is given by a start time in area 932*a* (labeled "Time/Date from") and finish time in area 932*b* (labeled "Time/Date from"). Each area is an active area in which a day and time can be selected, e.g. using a calendar. Panel 934 presents event ID in column 936*a*, a date time stamp in column 936*b*, and event type (info, warning, fault) in column 936*c*, an event name or description in column 936*d* and a count of occurrences in column 936*e*. The columns are labeled in a header row 935.

FIG. 9D is a block diagram that illustrates example printer events graphical display elements (e.g., for use with dashboard) for remote monitoring of printer, according to one embodiment. FIG. 9D depicts screen 904 that is launched from the dashboard screen of FIG. 7. Area 910, area 912*a*, area 912*b*, area 912*c*, area 912*d*, area 932*a* and area 932*b* are as described above. The type of display is presented in display name area 941, which depicts the name "Events Chart."

Screen 904 presents a graph of relative occurrences of different events. The events that can be added or removed from the graph are listed in panel 944*a*, each list element is an active area. Selecting it will cause the count of occurrences for that event to be added or removed from the graph. In the illustrated embodiment, the listed events include: performing quick stop; makeup insertions exceeded; EHT/HV calibration required, performing nozzle flush; message deleted; request clean start; printhead absent, makeup cartridge empty; and, new ink core has a different ink reference. Of these nine event types, four have been included in the graph, as described next. Panel 944*b* includes pie chart 945 and legend 946. In some embodiments the pie chart is colored and the legend indicates the color of each event included in the pie chart. For example, the legend indicates that the event types included in the pie chart are: makeup insertions exceeded in a first color (e.g., blue); performing nozzle flush in a second color (e.g., red); request clean start in a third color (e.g., green); and, EDT/HV calibration required in a fourth color (e.g., purple). The pie chart 945 shows these four events are ordered from the most frequent (largest slice) to the least frequent (smallest slice), with occurrence rates of 8.61%, 3.23%, 1.8% and 1.8%, respectively.

FIG. 9E is a block diagram that illustrates example printer measurement trends graphical display elements (e.g., for use with dashboard) for remote monitoring of printer, according to one embodiment. FIG. 9E depicts screen 905 that is launched from the dashboard screen of FIG. 7. Area 910, area 912*a*, area 912*b*, area 912*c*, area 912*d*, and area 918 are as described above. The type of display is presented in display name area 951, which depicts the name "Status Trends."

Screen 905 presents a line graph of sensor measurement values temporal changes for a subset of sensors that are associated with status. The sensors that can be added or removed from the graph are listed in panel 954a, each list element is an active area. Selecting it will cause trace of measured values for that sensor to be added or removed from the graph. In the illustrated embodiment, the listed sensors include: target pressure in bars; temperature compensated pressure in bars; actual pressure in bars; head temperature on the Celsius scale; nozzle temperature on the Celsius scale; velocity setpoint; actual velocity; drop frequency in kHz; modulation voltage setpoint; modulation current; and, ink core level. Of these eleven sensor measurements, three have been included in the graph, as described next. Panel 954b includes trend chart 955a with time on the horizontal axis 955b and relative value on vertical axis 955c. Panel 954b includes legend 956. In some embodiments the lines are colored and the legend indicates the color of each sensor measured values included in the trend chart. For example, the legend indicates that the sensor measurements included in the trend chart are: head temperature 956a in a first color (e.g., blue); drop frequency 956b in a second color (e.g., red); and, actual pressure in a third color (e.g., green). In some embodiments, the traces of the sensor measured values are offset and scaled vertically to allow the trends to be compared, so the vertical axis is a relative amount and not an actual amount, e.g., not actually pressure in bars and temperature in degrees Celsius.

3. Hardware Overview

Figure 10:
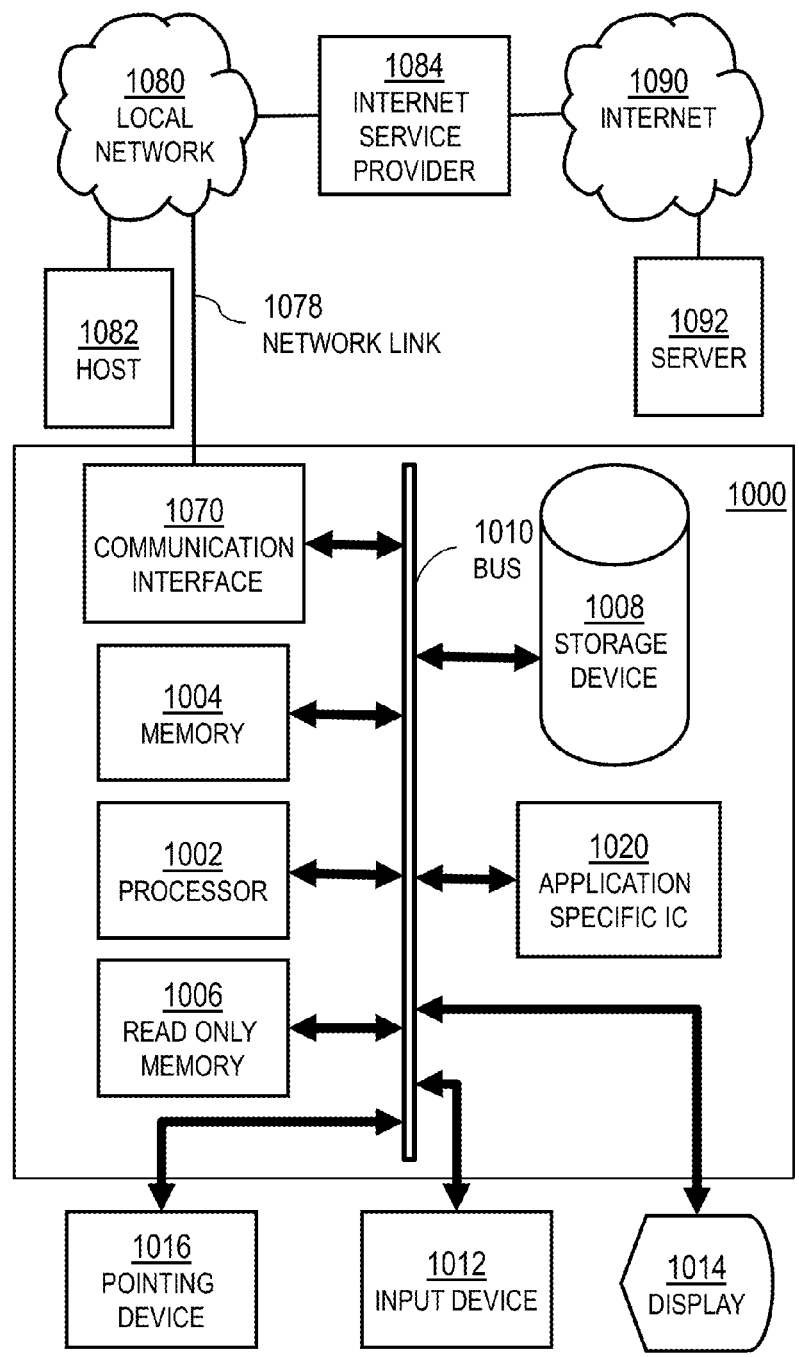
FIG. 10 is a block diagram that illustrates a computer system 1000 upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitute computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
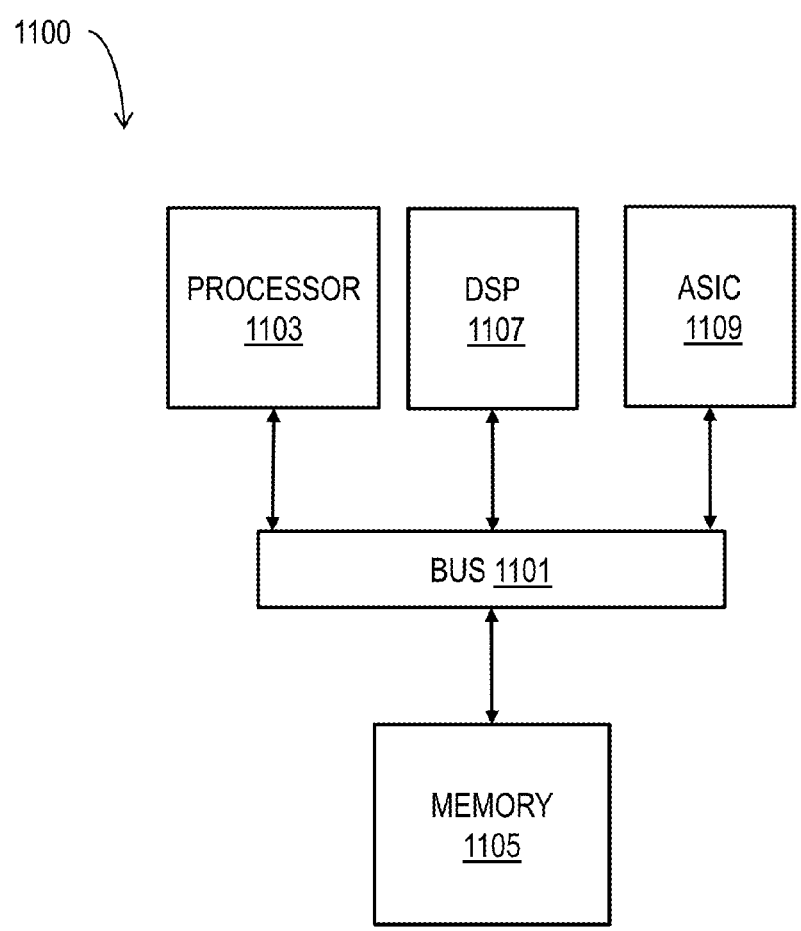
FIG. 11 illustrates a chip set 1100 upon which an embodiment of the invention may be implemented.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

Figure 12:
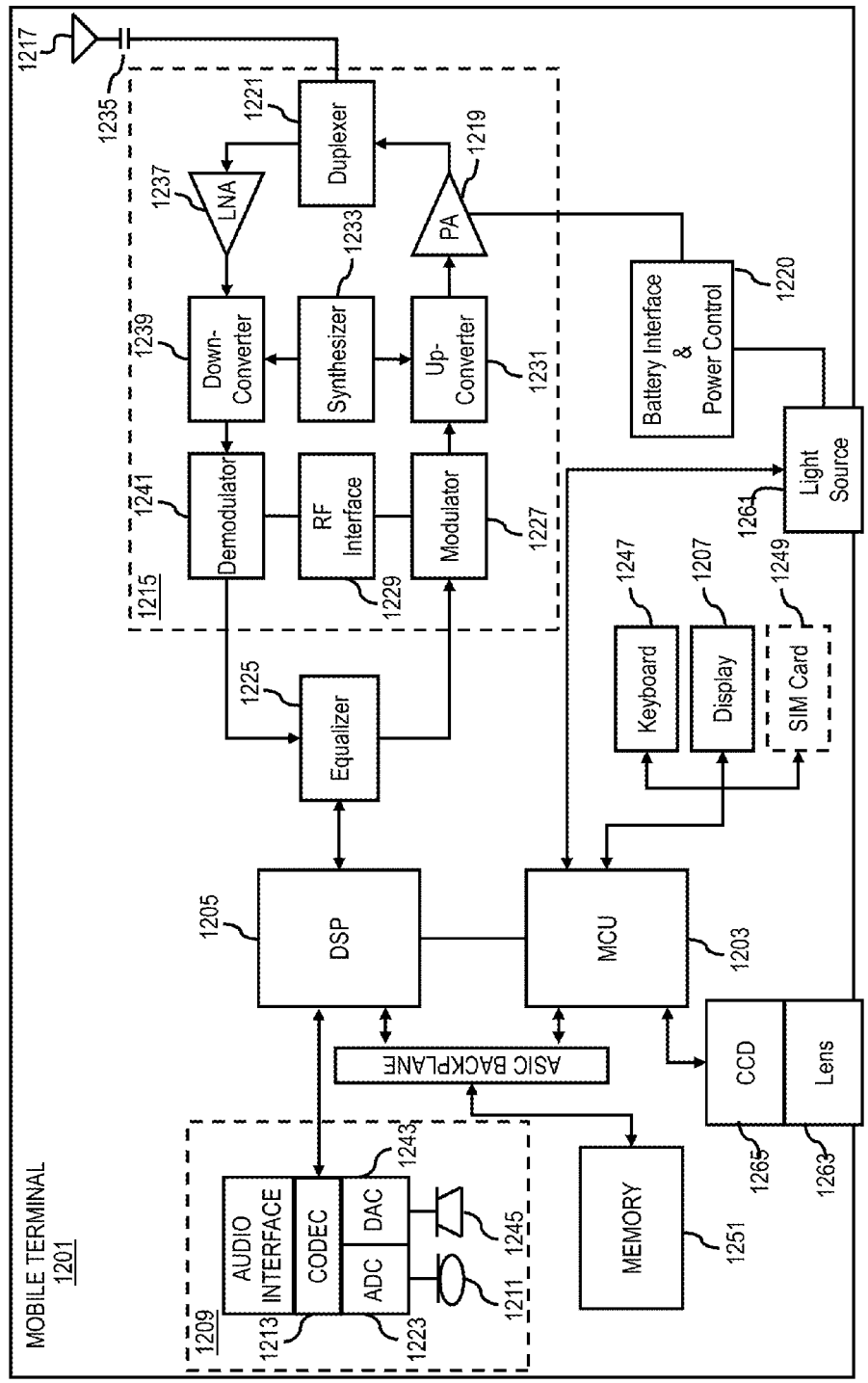
FIG. 12 is a diagram of exemplary components of a mobile terminal (e.g., handset) for communications, which is capable of operating in the system of FIG. 1, according to one embodiment.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps as described herein. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 as described herein. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

In some embodiments, the mobile terminal 1201 includes a digital camera comprising an array of optical detectors, such as charge coupled device (CCD) array 1265. The output of the array is image data that is transferred to the MCU for further processing or storage in the memory 1351 or both. In the illustrated embodiment, the light impinges on the optical array through a lens 1263, such as a pin-hole lens or a material lens made of an optical grade glass or plastic material. In the illustrated embodiment, the mobile terminal 1201 includes a light source 1261, such as a LED to illuminate a subject for capture by the optical array, e.g., CCD 1265. The light source is powered by the battery interface and power control module 1220 and controlled by the MCU 1203 based on instructions stored or loaded into the MCU 1203.

4. Extensions, Modifications and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A method comprising:
    obtaining, on a processor, sensor data that indicates a first plurality of values output by a first corresponding plurality of sensors configured to measure physical phenomena related to a plurality of components of an industrial printer, wherein the processor is at a remote site separated from a local site where the industrial printer is located;
    obtaining, on the processor, parameter data that indicates a second plurality of values for a second corresponding plurality of parameters that indicate user settings for operation of the industrial printer;
    determining, on the processor, a service issue related to the industrial printer based on the sensor data and the parameter data, wherein determining the service issue comprises determining a likely cause of the service issue based at least in part on historical data derived from sensor data and parameter data obtained over at least a month of time from a plurality of different industrial printers located at a plurality of different sites separated from the remote site;
    determining, at least in part on the processor, an action to be performed on the industrial printer in response to the service issue; and
    causing the action to be initiated.

2. A method as recited in claim 1, wherein the sensor data is selected from printhead sensor data, ink system sensor data, and consumable sensor data.

3. The method of claim 1 wherein the sensor data is selected from gutter buildup data, ink conductivity data, and number of cartridge insertions.

4. A method as recited in claim 1, wherein the action comprises providing instructions related to the service issue to a user of the industrial printer.

5. The method of claim 4 wherein the instructions comprise a video shown to the user on an interface of the printer.

6. The method of claim 1 wherein the action comprises querying the user for further data and using that data, on the processor, to provide instructions to the user.

7. The method of claim 6 wherein the action to be performed on the industrial printer in response to the service issue comprises the processor using an internal flow chart to determine queries to present to the user.

8. The method of claim 1 wherein the historical data is selected from sensor readings, user interactions, historical states, and combinations thereof.

9. A method, comprising:
obtaining, on a processor, sensor data that indicates a first plurality of values output by a first corresponding plurality of sensors configured to measure physical phenomena related to a plurality of components of an industrial printer, wherein the processor is at a remote site separated from a local site where the industrial printer is located;
obtaining, on the processor, parameter data that indicates a second plurality of values for a second corresponding plurality of parameters that indicate user settings for operation of the industrial printer;
determining, on the processor, a service issue related to the industrial printer based on the sensor data and the parameter data;
determining, at least in part on the processor, an action to be performed on the industrial printer in response to the service issue;
causing the action to be initiated;
wherein determining the action to be performed further comprises determining that a first value for a particular parameter of the second corresponding plurality of parameters that indicate user settings should be changed to a different second value; and
causing the action to be initiated further comprises communicating, from the remote site to the local site, correction data that indicates the different second value and the particular parameter.

10. A method as recited in claim 9, wherein communicating the correction data further comprises automatically sending a command to the industrial printer that causes the industrial printer to change the first value for the particular parameter to the different second value.

11. A method as recited in claim 1, wherein:
determining the action to be performed further comprises determining that a particular printer operation should be performed; and
causing the action to be initiated further comprises communicating, from the remote site to the local site, a command that automatically causes the particular printer operation to be performed.

12. A method comprising:
obtaining, on a processor, sensor data that indicates a first plurality of values output by a first corresponding plurality of sensors configured to measure physical phenomena related to a plurality of components of an industrial printer, wherein the processor is at a remote site separated from a local site where the industrial printer is located;
obtaining, on the processor, parameter data that indicates a second plurality of values for a second corresponding plurality of parameters that indicate user settings for operation of the industrial printer;
determining, on the processor, a service issue related to the industrial printer based on the sensor data and the parameter data;
determining, at least in part on the processor, an action to be performed on the industrial printer in response to the service issue;
causing the action to be initiated;
providing on the processor best practice data that relates to predetermined processes for operating and/or maintaining the printer;
the processor using the parameter data, the sensor data, and the best practice data to determine compliance of a period of operation of the printer with the best practice data; and
the processor notifying a user of the compliance of the printer with the best practice data.

13. A method as recited in claim 12, wherein the best practice data is selected from printhead cleaning data, fluid replacement data, printer startup data, consumable replacement data, and run hours data.

14. A method as recited in claim 12, further comprising ranking performance of the printer based on the compliance of the printer with the best practice data.

15. A system comprising:
a plurality of processors located at a plurality of facilities at a corresponding plurality of different locations;
an industrial printer configured to apply ink to a package on an production line at a particular facility of the plurality of facilities;
a communications network configured to support data communication among the plurality of processors; and
at least one memory including one or more sequences of instructions,
the at least one memory and the one or more sequences of instructions configured to, with the at least one processor, cause the system to perform at least the following:
obtain sensor data that indicates a first plurality of values output by a first corresponding plurality of sensors configured to measure physical phenomena related to a plurality of components of the industrial printer;
obtain parameter data that indicates a second plurality of values for a second corresponding plurality of parameters that indicate user settings for operation of the industrial printer;
determine a service issue related to the industrial printer based on the sensor data and the parameter data, wherein determining the service issue further comprises determining the service issue based at least in part on historical data derived from sensor data and parameter data obtained over at least a month of time from a plurality of different industrial printers located at two or more of the plurality of different facilities;
determine, at least in part, an action to be performed on the industrial printer in response to the service issue; and
cause the action to be initiated.

16. A system as recited in claim 15, wherein at least one facility is at a remote site separated from a local site where the industrial printer is located by at least about one hour travel time.

17. A system as recited in claim 15, wherein a first facility of the plurality of facilities is a facility of a first entity that uses the industrial printer and a different second facility of the plurality of facilities is a facility of a different second entity that services the industrial printer.

18. A non-transitory computer-readable medium carrying one or more sequences of instructions, wherein execution of the one or more sequences of instructions by one or more processors causes the one or more processors to perform the steps of:
obtaining sensor data that indicates a first plurality of values output by a first corresponding plurality of sensors configured to measure physical phenomena related to a plurality of components of an industrial printer;
obtaining parameter data that indicates a second plurality of values for a second corresponding plurality of parameters that indicate user settings for operation of the industrial printer;

determining a service issue related to the industrial printer based on the sensor data and the parameter data, wherein determining the service issue comprises determining a likely cause of the service issue based at least in part on historical data derived from sensor data and parameter data obtained over at least a month of time from a plurality of different industrial printers located at a plurality of different sites separated from the remote site;

determining, at least in part, an action to be performed on the industrial printer in response to the service issue; and causing the action to be initiated.

19. A method as recited in claim 9, wherein the sensor data is selected from printhead sensor data, ink system sensor data, and consumable sensor data.

20. The method of claim 9, wherein the sensor data is selected from gutter buildup data, ink conductivity data, and number of cartridge insertions.

21. A method as recited in claim 9, wherein the action comprises providing instructions related to the service issue to a user of the industrial printer.

* * * * *